US008509534B2

(12) United States Patent
Galic et al.

(10) Patent No.: US 8,509,534 B2
(45) Date of Patent: Aug. 13, 2013

(54) DOCUMENT PAGE SEGMENTATION IN OPTICAL CHARACTER RECOGNITION

(75) Inventors: Sasa Galic, Seattle, WA (US); Bogdan Radakovic, Redmond, WA (US); Nikola Todic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 826 days.

(21) Appl. No.: 12/720,943

(22) Filed: Mar. 10, 2010

(65) Prior Publication Data

US 2011/0222769 A1    Sep. 15, 2011

(51) Int. Cl.
    *G06K 9/36* (2006.01)
(52) U.S. Cl.
    USPC .......................................................... 382/176
(58) Field of Classification Search
    None
    See application file for complete search history.

(56) References Cited

U.S. PATENT DOCUMENTS

| | | | |
|---|---|---|---|
| 6,108,444 A | 8/2000 | Syeda-Mahmood | |
| 6,301,386 B1 * | 10/2001 | Zhu et al. | 382/176 |
| 8,086,050 B2 * | 12/2011 | Schwartz et al. | 382/232 |
| 8,320,674 B2 * | 11/2012 | Guillou et al. | 382/179 |
| 2005/0216564 A1 * | 9/2005 | Myers et al. | 709/206 |
| 2005/0259866 A1 | 11/2005 | Jacobs et al. | |
| 2006/0062453 A1 | 3/2006 | Schacht | |
| 2006/0120629 A1 | 6/2006 | Myers et al. | |
| 2007/0133874 A1 | 6/2007 | Bressan et al. | |
| 2008/0002893 A1 | 1/2008 | Vincent et al. | |

FOREIGN PATENT DOCUMENTS

| | | |
|---|---|---|
| JP | 2005-346707 | 12/2005 |
| WO | 2008003095 A2 | 1/2008 |

OTHER PUBLICATIONS

International Search Report from corresponding PCT Application Serial No. PCT/US2011/027935. dated Oct. 25, 2011, 8 pages.
Chen , et al., "Efficient Image Region and Shape Detection by Perceptual Contour Grouping", Retrieved at<<http://ieeexplore.ieee.org/stamp/stamp.jsp?tp=&arnumber=1626651&isnumber=34147>>, International Conference on Mechatronics & Automation, Niagara Falls, Canada, Jul. 2005, pp. 793-798.
Louloudis, et al., "Text Line Detection in Handwritten Documents", Retrieved at<<http://users.iit.demokritos.gr/~bgat/Louloud2008.pdf>>, Pattern Recognition 41, May 2, 2008, pp. 3758-3772.
Esposito, et al., "A Knowledge-Based Approach to the Layout Analysis", Retrieved at<<http://reference.kfupm.edu.sa/content/k/n/a_knowledge_based_approach_to_the_layout_58260.pdf>>, Proceedings of the Third International Conference on Document Analysis and Recognition, 1995, pp. 466-471.

* cited by examiner

*Primary Examiner* — Vikkram Bali

(57) ABSTRACT

Page segmentation in an optical character recognition process is performed to detect textual objects and/or image objects. Textual objects in an input gray scale image are detected by selecting candidates for native lines which are sets of horizontally neighboring connected components (i.e., subsets of image pixels where each pixel from the set is connected with all remaining pixels from the set) having similar vertical statistics defined by values of baseline (the line upon which most text characters "sit") and mean line (the line under which most of the characters "hang"). Binary classification is performed on the native line candidates to classify them as textual or non-textual through examination of any embedded regularity. Image objects are indirectly detected by detecting the image's background using the detected text to define the background. Once the background is detected, what remains (i.e., the non-background) is an image object.

20 Claims, 20 Drawing Sheets

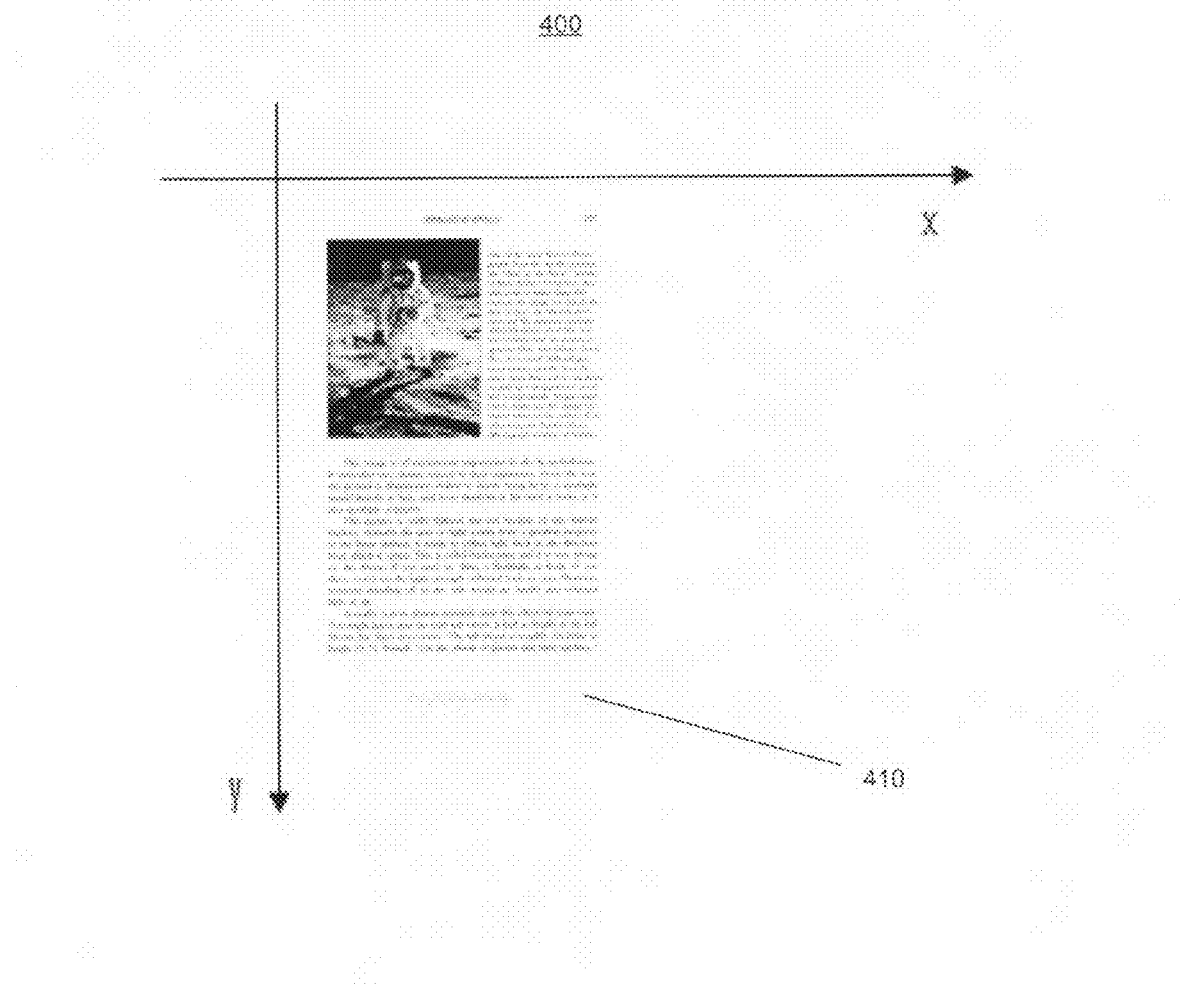

3100

3200

3300

DOCUMENT PAGE SEGMENTATION IN OPTICAL CHARACTER RECOGNITION

BACKGROUND

Optical character recognition (OCR) is a computer-based translation of an image of text into digital form as machine-editable text, generally in a standard encoding scheme. This process eliminates the need to manually type the document into the computer system. A number of different problems can arise due to poor image quality, imperfections caused by the scanning process, and the like. For example, a conventional OCR engine may be coupled to a flatbed scanner which scans a page of text. Because the page is placed flush against a scanning face of the scanner, an image generated by the scanner typically exhibits even contrast and illumination, reduced skew and distortion, and high resolution. Thus, the OCR engine can easily translate the text in the image into the machine-editable text. However, when the image is of a lesser quality with regard to contrast, illumination, skew, etc., performance of the OCR engine may be degraded and the processing time may be increased due to processing of all pixels in the image. This may be the case, for instance, when the image is obtained from a book or when it is generated by an image-based scanner, because in these cases the text/picture is scanned from a distance, from varying orientations, and in varying illumination. Even if the performance of the scanning process is good, the performance of the OCR engine may be degraded when a relatively low quality page of text is being scanned.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Page segmentation in an OCR process is performed to detect objects that commonly occur in a document, including textual objects and image objects. Textual objects in an input gray scale image are detected by selecting candidates for native lines which are sets of horizontally neighboring connected components (i.e., subsets of image pixels where each pixel from the set is connected with all remaining pixels from the set) having similar vertical statistics defined by values of baseline (the line upon which most text characters "sit") and mean line (the line under which most of the characters "hang"). Binary classification is performed on the native line candidates to classify them as textual or non-textual through examination of any embedded regularity in the native line candidates. Image objects are indirectly detected by detecting the image's background using the detected text to define the background. Once the background is detected, what remains (i.e., the non-background) is an image object.

In illustrative examples, native line candidates are selected by using a central line tracing procedure to build native lines. From the gray scale input, the application of an edge detection operator results in the identification of connected components. Horizontal neighbors are found for each connected component and scores are assigned to represent a probability that the connected component belongs to a textual line. Using a horizontal neighbors voting procedure, a central line is estimated for each connected component.

Starting with the maximal score connected component as a seed, the connected components to the right are sequentially added to the native line candidate if the differences between their estimated central lines and that of the seed are less than some threshold value. If the threshold difference is exceeded, or the last connected component on the right of the seed is encountered, the addition of connected components to the native line candidate is repeated on the left. One native line candidate results when this central line tracing is completed on both the right and left.

The native line candidate is passed to a text classifier, which may be implemented as a machine trainable classifier, to perform a binary classification of the candidate as either a textual line or non-textual line. The classifier examines the native line candidate for embedded regularity of features in "edge space" where each pixel is declared as either an edge or non-edge pixel. If the native line candidate has regular features, such as a distribution of edge angles that are indicative of text, the classifier classifies the native line candidate as text. Conversely, absence of such feature regularity indicates that the native line candidate is non-textual and the candidate is discarded. The process of native line candidate building and classifying may be iterated until all the detected connected components are either determined to be part of textual line or to be non-textual.

Once the location of text is determined using the aforementioned textual object detection, background detection is implemented by first decreasing the resolution of a document to filter out the text which is typically an order of magnitude smaller than image objects (which tend to be relatively large objects). Any text influence that remains after the resolution decrease may be removed through median filtering. An assessment of local uniformity of the background is made by application of a variance operator that is arranged to find flat areas in the document.

In order to decide how flat a pixel needs to be for it to be properly considered as a background pixel, the pixels which are part of the detected text are examined because the text background is assumed to define the image background. Since the locations of the detected text are known, a histogram of variance values at text pixels may be generated. From the histogram, a threshold value defining the maximal local background variance may be extracted. Pixel based classification is then performed based on the maximal background variance to identify potential background pixels and non-background (i.e., image) pixels and generate a classification image.

Using the observation that a feature of backgrounds is that they typically comprise large areas made up of connected homogenous pixels (i.e., pixels with small variance), detection of connected components in the classification image is performed. Connected component detection yields two sets of connected components including a set of connected components comprising homogenous pixels and a set of connected components comprising wavy pixels (i.e., pixels with large variance).

Image and background seeds are chosen from the wavy connected components set and homogenous connected components set, respectively. The remaining connected components in the sets will either be local fluctuations in the background or flat areas in the image. Successive merging of connected components from the wavy and homogeneous sets with their surrounding connected components is performed. This merging results in the wavy and homogenous sets being emptied and all pixels being assigned to either background or image connected components.

This Summary is provided to introduce a selection of concepts in a simplified form that are further described below in the Detailed Description. This Summary is not intended to

DESCRIPTION OF THE DRAWINGS

FIG. 4 shows an illustrative image coordinate system;

FIG. 5 shows an illustrative example of text organization using words and lines;

DETAILED DESCRIPTION

Figure 1:
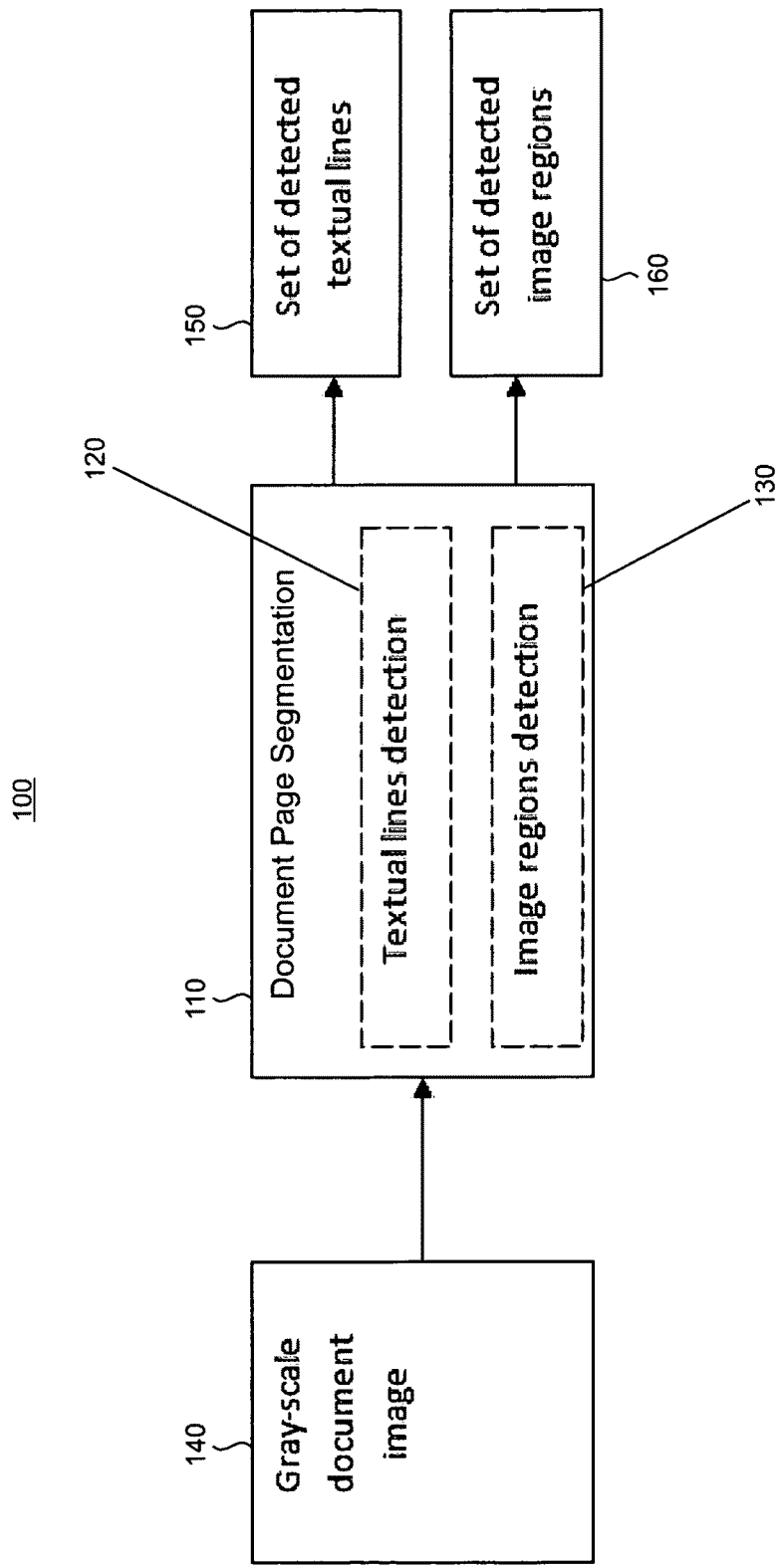
FIG. 1 shows an illustrative high level page segmentation architecture.

FIG. 1 shows an illustrative high level page segmentation architecture 100 which highlights features of the present document page segmentation techniques. In an illustrative example, the document page segmentation techniques may be implemented using algorithms as represented by block 110 in architecture 100, including textual lines detection 120 and image regions detection 130. As shown, the input to the document page segmentation algorithms 110 is a gray-scale document image 140 which will typically be de-skewed. The output of the algorithms 110 will be a set of detected textual lines 150 and a set of detected image regions 160.

Figure 2:
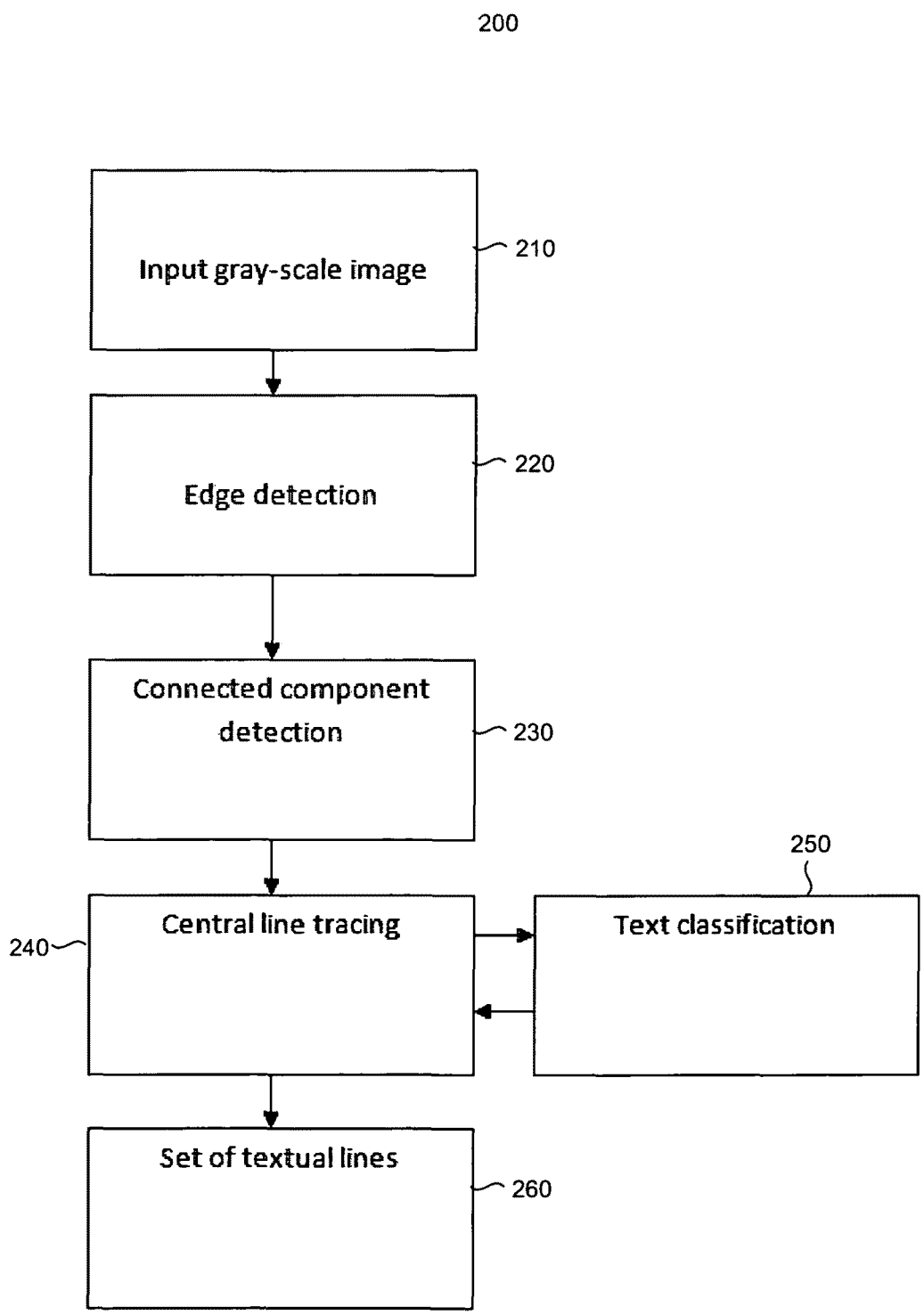
FIG. 2 shows a simplified functional block diagram of an illustrative textual lines detection algorithm.

FIG. 2 shows a simplified functional block diagram 200 of an illustrative textual lines detection algorithm that may be used in the present document page segmentation. Note that FIG. 2 and its accompanying description are intended to provide a high level overview of the present textual lines detection algorithm. Additional details of the textual lines detection algorithm are provided below.

As shown in FIG. 2, the input comprises a gray-scale image at block 210. Edge detection on the gray-scale image, at block 220, is utilized in order to deal with various combinations of text and background that may occur in a given document by looking for a sudden color change (i.e., an edge) between the text and the background.

At block 230, connected component detection is performed on the edges to identify connected components in a document which may include both textual characters and non-text (as defined below, a connected component is a subset of image pixels where each pixel from the set is connected with all remaining pixels from the set). At block 240, central line tracing is performed (where a central line of a textual line is halfway between the baseline and mean line, as those terms are defined below) for each of the detected connected components to generate a set of native line candidates (where, as defined below, a native line is a set of neighboring words, in a horizontal direction, that share similar vertical statistics that are defined by the baseline and mean line values). The native line candidates generated from the central line tracing are classified as either textual or non-textual lines in the text classification block 250. The output, at block 260 in FIG. 2, is a set of textual lines.

Figure 3:
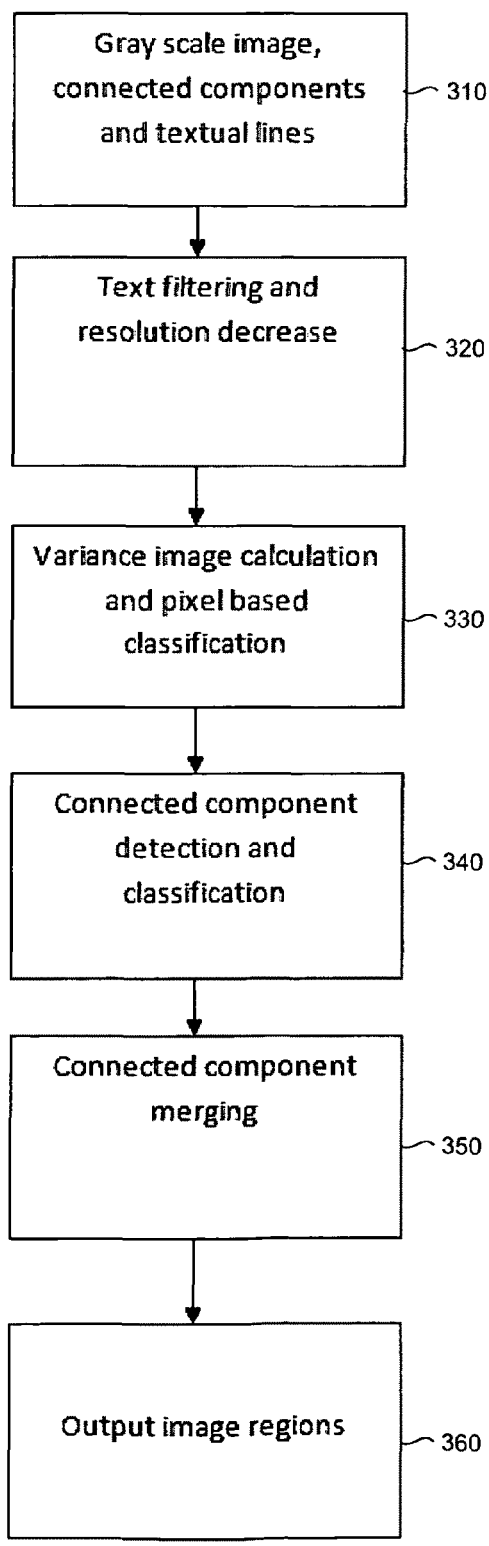
FIG. 3 shows a simplified functional block diagram of an illustrative image regions detection algorithm.

FIG. 3 shows a block diagram 300 of an illustrative image regions detection algorithm. Note that FIG. 3 and its accompanying description are intended to provide a high level overview of the present image regions detection algorithm. Additional details of the image regions detection algorithm are provided below.

As shown in FIG. 3 at block 310, the input comprises a gray-scale image, and the connected components and textual lines from the application of the textual lines detection algorithm that was summarized above. At block 320, the input image is decreased in resolution which simultaneously largely filters text (and to the extent that any text remains after resolution decrease, median filtering may be applied to eliminate the remaining text influence). A variance image calculation and pixel based classification is performed, at block 330, to separate the background and image regions.

Connected component detection and classification is performed at block 340 which results in two sets of connected components: a set comprising connected components having homogenous pixels (i.e., pixels with small variance), and a set comprising connected components having wavy pixels (i.e., pixels with large variance). At block 350, each of the connected components in the sets is successively merged with its surrounding connected component to become either part of the image or the background. Image detection is completed at that point and the set of image regions is output at block 360 in FIG. 3.

In order to facilitate presentation of the features and principles of the present document page segmentation techniques, several mathematical notions are introduced below.

Definition 1: A digital color image of width w and height h is the vector function of two arguments $\vec{T}:W \times H \rightarrow GS^3$ where $GS=[0, 1, \ldots, 255]$, $W=[0, 1, \ldots, w-1]$, $H=[0, 1, \ldots, h-1]$ and × denotes Cartesian product. It will be evident that this definition is derived from the RGB color system and components r, g, b in $\vec{T}(r, g, b)$ correspond to red, green, and blue components, respectively.

Definition 2: A digital gray-scale image of width W and height H is the scalar function of two arguments $I:W \times H \rightarrow GS$ where GS may be:
  GS=[g1,g2], where the gray-scale image is referred to as binary, bi-level, or bi-tonal image
  GS=[g1, g2, g3, . . . , g16] where the gray-scale image is referred to as 16-level gray-scale image
  GS=[g1, g2, g3, . . . , g256] where gray-scale image is referred to as 256-level gray-scale image.

At this point, one convention used throughout the discussion that follows is introduced. Since the image is considered as a function, the coordinate system of its graphical presentation is defined. Usually, the top-left corner of the image is taken as a reference point. Therefore, a convenient system that may be utilized is coordinate system 400 that is shown in FIG. 4 in which the top-left corner of the image 410 is placed at the origin of the x-y axes.

Definition 3: The triplet (I(x, y), x, y) is called a pixel. The pair (x, y) is called the pixel coordinates, while I(x, y) is called the pixel value. Typically, the term pixel is used for coordinates, value, and pair interchangeably. The term pixel is also used this way whenever no confusion is possible, otherwise the exact term will be used. Also notation I(x, y) will be used interchangeably whenever no confusion is possible.

An understanding of a digital image is provided by the three definitions presented above. The task of image processing typically includes a series of transformations that lead to some presentation of an original image that is more convenient for further analysis for which conclusions may be drawn. The following definitions provide a mathematical means for formalization of these transformations.

Definition 4: Let $\Omega$ be the set of all images with dimensions w and h. The function $T:\Omega^n \rightarrow \Omega$ is called n-ary image operator. In the case n=1, the operator is unary while for n=2, the operator is binary.

The definition above implies that the operator is the function that transforms an image (or several images) into another image using some set of transformation rules. In many applications, the useful image operators are filter-based operators. The filter (sometimes called kernel or mask) is the matrix $A_{nm}$ $$\begin{bmatrix} a_{11} & a_{12} & \ldots & a_{1m} \\ a_{21} & a_{22} & \ldots & a_{2m} \\ \ldots & \ldots & & \ldots \\ a_{n1} & a_{n2} & \ldots & a_{nm} \end{bmatrix}$$

of n×m size. Usually, n is equal and m is odd, so there are 3×3, 5×5, 7×7 filters etc. The filter-based operator transforms the input image using the rule that pixel $I_o(x, y)$ in the output image is calculated using formula:

$$I_0(x, y) = \sum_{i=1}^{n} \sum_{j=1}^{m} a_{ij} I\left(x - \frac{n}{2} + i - 1, y - \frac{m}{2} + j - 1\right)$$

where all divisions are integer divisions. In other words, the pixel in the output image is constructed by convolving the neighborhood of the corresponding pixel in the input image with the filter.

Definition 5: Let I be the image of width w and height h, and I(x, y) be the arbitrary pixel. The set of pixels {I(x+1, y), I(x-1, y), I(x, y+1), I(x, y-1)} is called the 4-neighbors of I(x, y). Similarly, the set of pixels {I(x+1, y), I(x-1, y), I(x, y+1), I(x, y-1), I(x-1, y-1), I(x-1, y+1), I(x+1, y-1), I(x+1, y+1)} is called 8-neighbors of I(x, y).

There are different definitions of adjacency discussed in the literature but a convenient one will be chosen for the discussion that follows.

Definition 6: The two pixels $I(x_1, y_1)$ and $I(x_2, y_2)$ are adjacent if $I(x_2, y_2)$ is a member of the 8-neighbors set of $I(x_1, y_1)$ and their pixel values are "similar".

The word similar is in quotes above because no strict definition of similarity exists. Rather, this definition is adopted according to application demands. For example, it may be said that two pixels are similar if their pixel values are the same. Throughout the remainder of the discussions this definition will be assumed, unless stated otherwise.

Definition 7: The two pixels $I(x_1, y_1)$ and $I(x_n, y_n)$ are connected if the set $\{I(x_2, y_2), I(x_3, y_3), \ldots, I(x_{n-1}, y_{n-1})\}$ exist, such that $I(x_i, y_i)$ and $I(x_{i+1}, y_{i+1})$ are adjacent for i=1, 2, . . . , n-1.

Definition 8: The connected component is the subset of image pixels where each pixel from the set is connected with all remaining pixels from the set.

Text Detection: Before actually describing the text detection algorithm in greater detail, some definitions and observations regarding the text features are presented. The goal of some previous attempts at text detection is the detection of so called "text regions." The term text region is somewhat abstract and no formal and consistent definition exists in the literature today. Therefore, the task of detecting and measuring results of text region accuracy can be difficult because a consistent definition of the objects to detect does not exist.

Accordingly, a goal is to find some other way of detecting text, and in particular, a place to start is to clearly define the objects to detect (i.e., a text object). Prior to defining the target text objects, some text features are introduced. One particular text feature that may be used for text detection is its organization in words and lines. An example 500 of the text organization in words and lines is given in FIG. 5 with words in the red boxes (representatively indicated by reference number 510) and lines in the blue boxes (representatively indicated by reference number 520).

Figure 6:
FIG. 6 shows an illustrative example of text regularity that may be used in text detection.
Figure 7:
FIG. 7 shows an illustrative example of a common, minimal text area in which all characters are present.

Although the feature of organization into words and lines can be powerful, text is also equipped with more regularity that can be used in text detection. To illustrate this observation, some exemplary text 600 in FIG. 6 may be examined. The first thing to notice is that text characters differ in size. Moreover, their bounding boxes may fairly differ. However, all of the characters share a common feature, namely that a minimal area exists where all characters are present, either partially or completely. Most of the characters have a top and bottom equal to the top and bottom of this area. The area is depicted with red rectangle 710 in FIG. 7.

Some of the characters are completely included in the common area like the letter "o". On the other hand, some characters spread above the area and are called ascenders, an example being the letter "l". Similarly, some characters spread below the common area and are called descenders, such as the letter "g". In spite of this, for every pair of characters a common vertical area exists. Due to the importance of this area, its lower and upper limits have names—baseline and mean line, respectively.

Definition 9: The baseline is the line upon which most of the characters "sit".

Definition 10: The mean line is the line under which most of the characters "hang".

Definition 11: The difference between baseline and mean line is called the x-height.

Figure 8:
FIG. 8 shows a graphical representation of baseline, mean line, and x-height for an exemplary word.

The mean line, x-height, and baseline as defined above, are illustrated in FIG. 8 using the blue, green, and red lines as respectively indicated by reference numbers 810, 820, and 830.

It may be tempting, at this point, to define the text objects to detect as lines. Unfortunately, this may be difficult when using the definition of line as perceived by humans. To elaborate on this statement, the organization of exemplary text 500 shown in FIG. 5 may again be examined. To a human, it may be evident that there are three text lines. However, a text detection algorithm is not provided with some of the information that a human takes into account when determining the number of lines, namely the text content and semantics. Accordingly, in light of such observation, page segmentation will not ordinarily perform semantic analysis of any kind, and will typically just make conclusions based on geometrical information.

Figure 9:
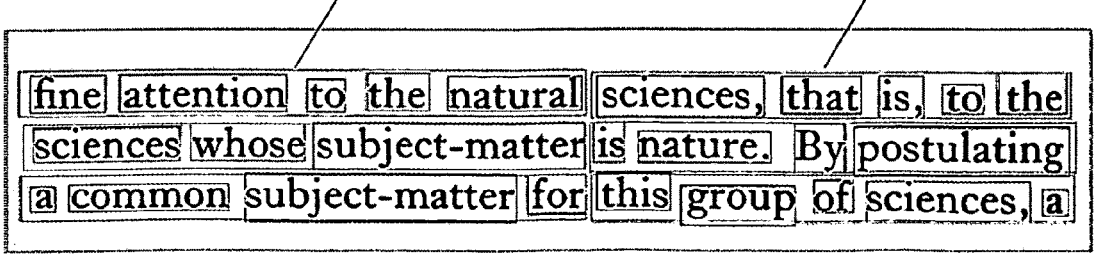
FIG. 9 shows an example of how the regular geometry of word interspacing could lead to a conclusion, based only on geometric information, that two text columns are present.

Without semantic information, and just using geometry, one could say that there are 6 lines in the sample text 500, as illustrated in FIG. 9, due to the presence of two columns 910 and 920 that may be observed by noting the regular geometry of word interspacing between the lines. To avoid this confusion, the textual objects will be precisely defined using the following definition.

Definition 12: The native line is the set of neighboring words (in the horizontal direction) with similar vertical statistics. Vertical statistics are defined with the baseline and mean line values.

The term "similar" in the previous definition prevents the definition from being considered as completely precise. That is, if the word "same" were used instead of "similar" the definition would be exact but practically useless due to the possible presence of deformations (for example "wavy" lines due to poor scanning). The degree of similarity utilized may thus reflect a compromise between the resistance to deformations and text detection accuracy.

Note that the native line definition does not imply uniqueness of detection. One reading line may be broken in two lines, or two lines from adjacent columns may be merged in one native line. As long as all words are inside native lines, the text detection is considered to be of high quality. Moreover, the definition of native line implies the high regularity of native line objects which makes them less difficult to detect.

Now that the text objects to be detected and their features are defined with the preceding discussion, details of an illustrative text detection algorithm are now presented. The detection algorithm includes two parts: selection of the native line candidates, and native line classification. In the next section, an illustrative procedure for the selection of candidates using central line tracing is described.

Figure 10:
FIG. 10 depicts a typical magazine document having a complex color gradient.

Central Line Tracing—A relatively large number of approaches described in the literature make the assumption that input image is binary. If not so, then an assumption is made that the text is darker than the text background. This makes the task of building the document image segmentation algorithm easier, but unfortunately also limits the scope of supported input images. To avoid these kinds of assumptions and explore the ways of dealing with a wide variety of document images, one particular example may be examined. A typical magazine page 1000 is depicted in FIG. 10. On the right side of image 1005 are three text excerpts from the page 1000 which are enlarged, as respectively indicated by reference numbers 1010, 1020, and 1030.

An evident conclusion may be that any algorithm which assumes the uniform font-background relationship (which means the presence of the same font color on the same background color) is destined to fail on this page. There are three different combinations of text-background color, which makes this image extremely difficult to segment. To override this difficulty an observation may be made—although in all three cases there are different text-background color combinations, there is one common denominator, namely that there is a sudden color change, or "edge," between the text and background. To make this explanation more complete, an image 1100 of the color gradient, as represented in an edge image (also referred to as an edge space), is provided in FIG. 11.

Figure 11:
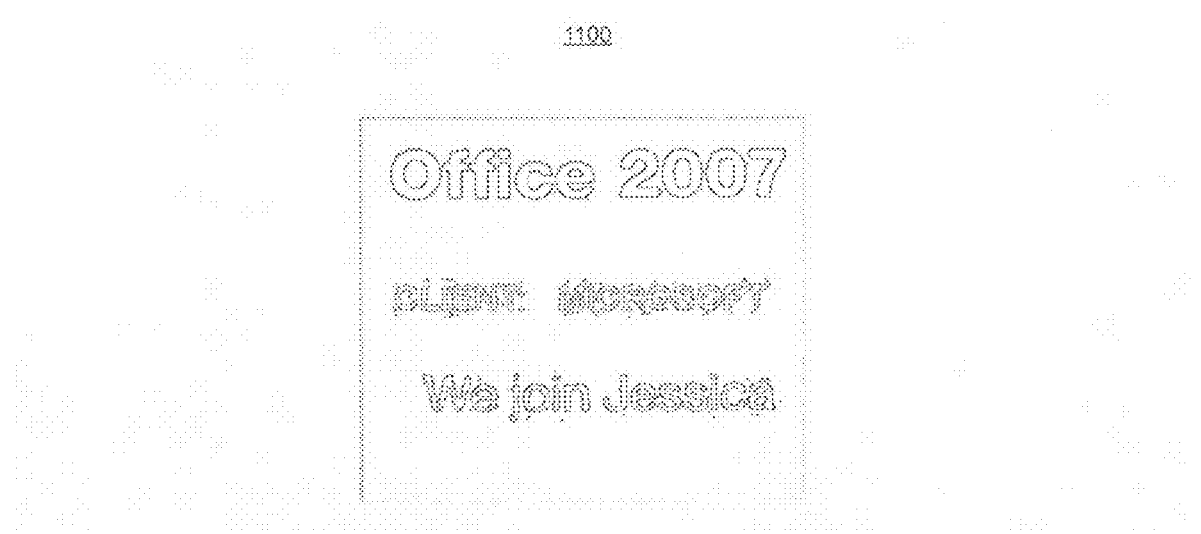
FIG. 11 shows an example of text information, in the edge space, contained in the magazine document depicted in FIG. 10.

As shown, all significant text information is preserved in the color gradient image 1100 in FIG. 11. However, all three excerpts share the same feature: now there is dark text on white background. Instead of having to cope with a complex problem (due to variable font-background color combinations), such problem in an edge image can be dealt with by treating all combinations using the same approach. This underscores the significance of edges in page segmentation.

Now work will be done on the edge image. In the edge space, each pixel is declared as an edge or non-edge pixel (see, for example, FIG. 11 where the edge pixels are all non-white pixels). In the case of an edge pixel, its edge intensity and direction are calculated.

Let $CC = \{cc_1, cc_2, \ldots, cc_n\}$ be the set of connected components of a document image in edge space where n is the number of connected components (card(CC)=n) and $cc_i$ is the i-th connected component.

Let $BB(cc_i) = \{(x, y) | x_{i,left} \leq x \leq x_{i,right}, y_{i,top} \leq y \leq y_{i,bottom}\}$ be the bounding box of $cc_i$ where $x_{i,left}$ and $x_{i,right}$ are the minimal and maximal x coordinates in the set of pixels making up $cc_i$ and $y_{i,top}$ and $y_{i,bottom}$ are the minimal and maximal y coordinates in the set of pixels making up $cc_i$.

Definition 13: The set of horizontal neighbors of $cc_i$ may be defined as $$HN(cc_i) = \{cc_j \in CC | |y_{i,top} - y_{j,top}| < \epsilon \wedge |y_{i,bottom} - y_{j,bottom}| < \epsilon\}$$

where $\epsilon$ is a positive real number. This set is ordered meaning $$\forall cc_j, cc_k \in HN(cc_i); j > k \Rightarrow x_{j,left} > x_{k,right}$$

and it holds that $d(cc_j, cc_{j+1}) < \delta$, $j=\{1, 2, \ldots, n-1\}$ where pseudo-metric d is defined as $d(cc_l, cc_k) = |x_{k,left} - x_{l,right}|$. The d is pseudo-metric since it is not symmetric and $d(cc_j, cc_j) \neq 0$.

In other words, the set of horizontal neighbors includes all connected components with similar tops and bottoms of the bounding boxes ordered in a left to right fashion with two successive connected components being "close." The degree of similarity is defined with the value of $\epsilon$ and, for example, may be chosen to be equal to the bounding box height. The degree of closeness is dictated with the value $\delta$ and may be chosen to be, for example, twice a bounding box height. It follows that if a connected component corresponds to a character, then the set of horizontal neighbors correspond to the surrounding characters in the text line. The choice of $\epsilon$ does not need to be strict since it is only needed, that it have all same line characters in the horizontal neighbors set. The price paid for a relaxed choice of $\epsilon$ is the possible presence of some other connected components that do not belong to a textual line. However, these extra components can be filtered with successive processing.

The choice of $\delta$ is also not typically critical because smaller values result in a greater number of native lines (i.e., reading lines being broken into a number of native lines) while greater values result in a smaller number of native lines (i.e., two reading lines from two columns with the same statistics end up being merged into one native line). As previously explained, both results are acceptable as long as all words on the document image end up as part of native lines.

Once all horizontal neighbor sets have been found, a likelihood that a particular connected component is actually part of some text line may be determined. To accomplish this, the line statistic discussion previously presented above will be used. The likelihood of one connected component being a part of a text line may be calculated using the formula:

$$S(cc_i) = \sum_{j=1}^{n} T(cc_i, cc_j) + \sum_{j=1}^{n} B(cc_i, cc_j);$$

$$cc_j \in HN(cc_i) \quad j = \{1, 2, \ldots, n\}$$

where $$T(cc_i, cc_j) = \begin{cases} 1, & |x_{i,top} - x_{j,top}| < \varepsilon_s \\ 0, & \text{otherwise} \end{cases}$$

$$B(cc_i, cc_j) = \begin{cases} 1, & |x_{i,bottom} - x_{j,bottom}| < \varepsilon_s \\ 0, & \text{otherwise} \end{cases}$$

A score is assigned to all connected components and it is, in some sense, proportional to the probability of a connected component belonging to the text line. This score is equal to the count of all connected components that have similar top or bottom coordinates. The degree of similarity is dictated with the $\epsilon_s$ value. This value, quite opposite to the previous similarity values, can be very strict in many cases. The value chosen may be, for example, one tenth of the connected component bounding box height.

At this point, horizontal neighbor sets have been calculated as well as scores assigned to each connected component. The last thing that may be performed before selecting native line candidates is an estimation of vertical statistics for each connected component. To do this, some observations are made.

Figure 12:
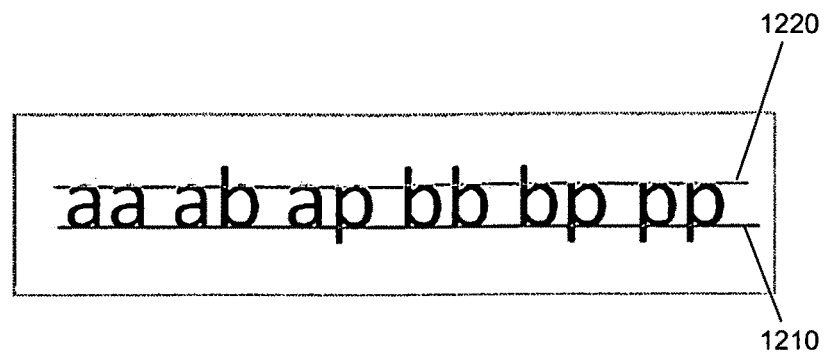
FIG. 12 shows possible combinations of two characters of three types (ascender, descender, and other) with respect to vertical statistics.

There are three types of characters with respect to vertical statistics: ascenders (i.e., parts of characters are above the mean line), descenders (i.e., parts of characters are below the baseline) and other characters (i.e., characters that are completely between the baseline and the mean line). The possible combinations of two characters are depicted in FIG. 12. The baseline is given with the red line as indicated by reference number 1210 and the mean line is given with the blue line 1220. Note these values are not independent along the textual line. Rather, they are tied through x-height. Therefore, instead of dealing with two values, a combination may be used.

Definition 14: The central line of the textual line is the line halfway between the baseline and the mean line.

Figure 13:
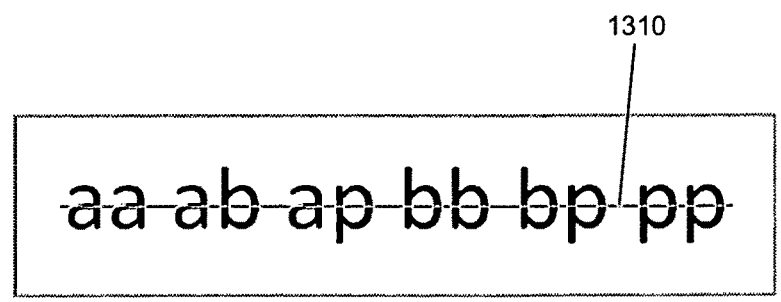
FIG. 13 shows the central line (a line halfway between the baseline and the mean line) of a textual line.

The central line is illustrated in FIG. 13 with a green line 1310. Using the central line, the essence of the vertical statistics of the text is preserved. In other words, the x-height is lost, but this is not relevant for subsequent processing and the analysis is easier due to fewer values to estimate. Now, some way to estimate the central line for each connected component is found. To do this FIG. 13 is examined in more detail.

Although there are different spatial combinations of characters, one thing remains fairly constant. If, for each character combination, the interval that is at the vertical intersection of character bounding boxes is calculated, the central line can be expected to be around half of this interval. This observation can be a key for estimating the central line of a connected component which is described below.

The arbitrary connected component $cc_i$ is selected. Now, $cc_j \in HN(cc_i)$ is also chosen. If the vertical intersection of these two connected components is found and the mid value of this interval is taken, this value may be considered as the first approximation of the central line of $cc_i$. Another way of looking at this is to consider this mid value as the vote of $cc_j$ for central line of $cc_i$. Picking all other connected components from $HN(cc_i)$ and collecting their votes, some set of votes is determined. If $cc_i$ is really a part of a textual line, then there will be one dominant value in this set. Adopting this value as the central line of $cc_i$, a good approximation for the real central line of $cc_i$ is found. The votes may be conveniently depicted in the form of a histogram. A piece of sample text 1410 and an associated histogram 1420 are depicted in the FIG. 14.

Figure 14:
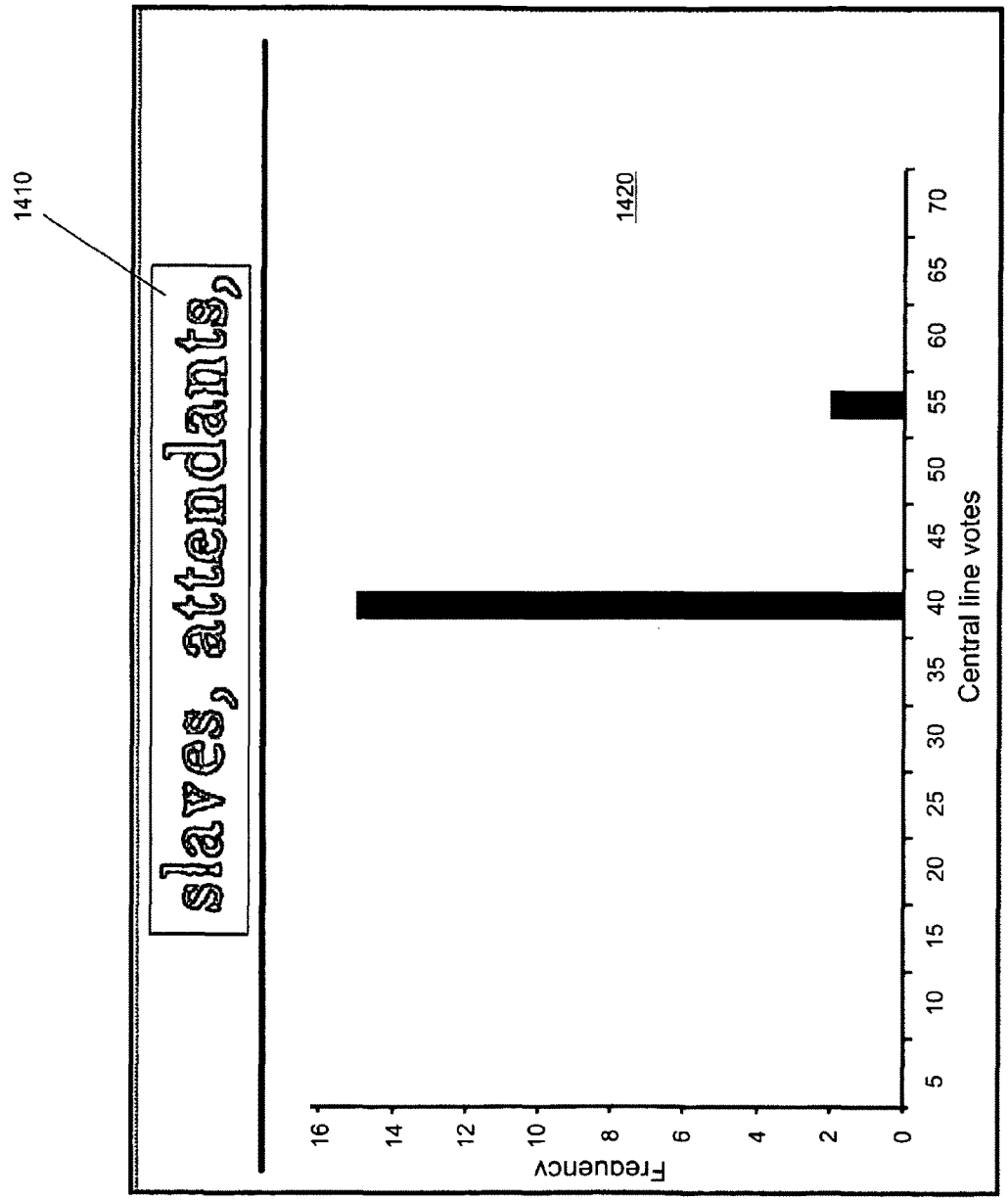
FIG. 14 shows an illustrative histogram of central line votes for an arbitrary text example.

The central line is estimated for the connected component that corresponds to letter "d" in FIG. 14. All other letters have their equivalent in connected components (except the letters "t" and "e" which are merged) and they are all in the set of horizontal neighbors of connected components that corresponds to the letter "d." The height of the image is around 70 pixels, and the central line of the text is around the $37^{th}$ pixel. The results thus indicate that all letters voted the same (15 votes total) while the two punctuation signs also contributed with two different votes. Accordingly, it follows from the histogram that the central line is around the $40^{th}$ pixel. The central line estimation procedure discussed above will be referred to as horizontal neighbors voting procedure in the remainder of the discussion that follows.

At this point, all the needed data is available and all the procedures have been defined to explain the native line candidates picking procedure. This procedure is called "central line tracing" (the reasons for this name will become more evident shortly).

The central line tracing procedure steps include:
1) Find the set of horizontal neighbors for each connected component.
2) Assign the score to each connected component which represents the measure of probability that a connected component belongs to a textual line.
3) Estimate the central line using horizontal neighbors voting procedure for each connected component.

4) Find the connected component with the maximal score that is not inside a native line or was not already visited (in the first instance that the step is performed this means all the connected components). Use $cc_{ms}$ as the notation for maximal score connected component.
5) Perform the native line building using maximal score connected component as the seed. First, move in the direction to the right (this is possible since the horizontal neighbor set is ordered). The first connected component to the right is $cc_{ms,R1}$ (index R1 means the first connected component to the right, the second one is marked with R2 and so on). If the difference between estimated central lines of $cc_{ms}$ and $cc_{ms,R1}$ is smaller than $\epsilon_{cl}$, then $cc_{ms,R1}$ is added to $nl_{new}$. Otherwise, the moving to the right is terminated. If the $cc_{ms,R1}$ is added, the same steps are repeated with $cc_{ms,R2}$, then $cc_{ms,R3}$ until the moving process is terminated or the last connected component is encountered. The same process of adding connected components is analogously repeated to the left. Once both moving processes are finished, the native line candidate has been built.
6) Once the native line candidate has been built, it is classified as either a textual or non-textual line using the text classifier. Native line classification is described in greater detail in the "Text classification" discussion below.
7) If the text classifier declares that the built native line is textual, all connected components making up the native line are marked as part of that native line, the native line is added to the set of native lines, and central line tracing procedure is restarted from step 4. If the text classifier declares the native line to be non-textual, then the native line is discarded, the maximal score connected component is marked as already visited, and the central line tracing procedure is repeated from step 4.
8) The central line tracing procedure stops when all connected components are either marked as part of some native line or marked as visited.

The outcome of the central line tracing procedure is the set $NL=\{nl_1, \ldots, nl_m\}$ of native lines found where each native line is actually a set of connected components making up that line, e.g. $nl_i=\{cc_l, \ldots, cc_k\}$.

Two observations can be made in light of the previous explanation. First, it is now evident that this procedure is named central line tracing because an aspect of the algorithm is building the line through "tracing" of the central line. Second, the value of $\epsilon_{cl}$ is influential to the behavior of the central line tracing algorithm. The smaller the value, the more strict the criteria (i.e., some random edges on pictures will not be traced along). However, this makes central line tracing more sensitive to deformations. The more the criteria is relaxed (i.e., is less strict), the less sensitive the algorithm becomes to deformations, but more native lines will be found based on random picture edges. A good compromise value could be, in some applications, one third of maximal score connected component height.

Figure 15:
FIG. 15 shows an illustrative color document having some text and a part of a picture.
Figure 16:
FIG. 16 shows the results of gray-scale conversion of the document shown in FIG. 15.
Figure 17:
FIG. 17 shows the results of edge detection for the image shown in FIG. 16.

The central line tracing procedure will be illustrated in the remainder of the discussion using an exemplary color document 1500 with some text 1510 and part of a picture 1520 as depicted in FIG. 15. The results of gray-scale conversion and edge detection are illustrated in FIGS. 16 and 17 and respectively indicated by reference numbers 1600 and 1700.

Figure 18:
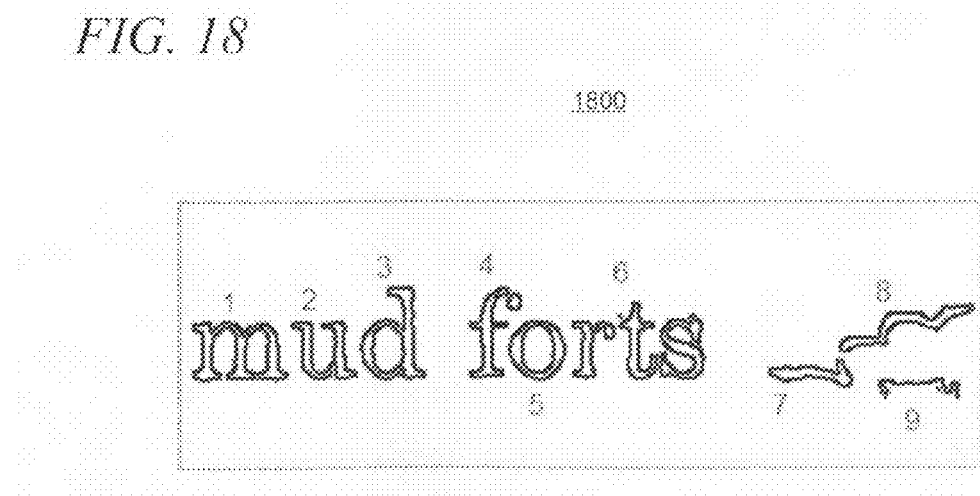
FIG. 18 shows the results of connected component detection for the image shown in FIG. 17.

The edge detection process forms a number of connected components: five connected components for letters "m", "u", "d", "f", and "o", one connected component for merged letters "r", "t", and "s", and three connected components for the image edges. The results of connected component detection are depicted in FIG. 18 in red text as collectively indicated by reference number 1800.

Next, the horizontal neighbor sets are found. A graphical presentation of all horizontal neighbor sets would make a drawing cluttered and unclear so therefore this process may be illustrated analytically. The sets are described:

$HN(cc_1)=\{cc_1,cc_2,cc_3,cc_4,cc_5,cc_6,cc_7,cc_8,cc_9\};$ $HN(cc_2)=\{cc_1,cc_2,cc_3,cc_4,cc_5,cc_6,cc_7,cc_8,cc_9\};$ $HN(cc_3)=\{cc_1,cc_2,cc_3,cc_4,cc_5,cc_6,cc_7,cc_8,cc_9\};$ $HN(cc_4)=\{cc_1,cc_2,cc_3,cc_4,cc_5,cc_6,cc_7,cc_8,cc_9\};$ $HN(cc_5)=\{cc_1,cc_2,cc_3,cc_4,cc_5,cc_6,cc_7,cc_8,cc_9\};$ $HN(cc_6)=\{cc_1,cc_2,cc_3,cc_4,cc_5,cc_6,cc_7,cc_8,cc_9\};$ $HN(cc_7)=\{cc_7\};$ $HN(cc_8)=\{cc_8\};$ $HN(cc_9)=\{cc_9\};$

Note that connected components corresponding to characters have sets which have all connected components in the image. This is due to relaxed horizontal neighbors picking criteria. On the other hand, the connected components corresponding to the image edges have only themselves in horizontal neighbors set. This is the result of a lack of connected components being similar with respect to vertical statistics. Now, the scores for all connected components are calculated. The scores are:

$S(cc_1)=S(cc_2)=S(cc_5)=9$ $S(cc_3)=s(cc_4)=8$ $S(cc_6)=7$ $S(cc_7)=S(cc_8)=S(cc_9)=2$

Figure 19:
FIG. 19 shows central lines that are estimated for the connected components shown in FIG. 18.

The letters "m", "u" and "o" are all similar (in terms of vertical statistics) and have the greatest score due to being the dominant type of letters. The two ascenders also have a high score but are lower in comparison to the three regular letters. The merged letters "r," "t," and "s" also have a number of letters with a similar bottom coordinate which is the cause for their high score. The connected components corresponding to image edges have no other connected components in their horizontal neighbor sets but themselves, so their score is the smallest possible (i.e., 2). Once the scores are calculated, the estimates for a central line are adopted for each connected component. Using the previously described horizontal voting procedure one obtains the central lines depicted in FIG. 19 as collectively indicated by reference number 1900.

It is evident that connected components for letters have very similar estimates due to a large number of similar votes from other letters. However, connected components derived from image edges have no votes and a default value is adopted (e.g., a value between the top and bottom of a connected component).

At this point the central line tracing procedure may be started. The maximal score connected component is picked. Since there are three connected components with the same score (maximal one), one may be arbitrarily chosen and let be $cc_2$ (letter "u"). A new native line is built $nl_1=\{cc_2\}$ out of this "seed" connected component. Then, moving in the direction to the right, the first connected component is $cc_3$. Since the central line estimates of $cc_2$ and $cc_3$ are very similar, $cc_3$ is added to the native line, producing $nl_1=\{cc_2,cc_3\}$. Moving to the left, a similar reasoning may be applied to $cc_4$, $cc_5$, and $cc_6$. When $cc_7$ is reached, its central line differs significantly from $cc_2$ and moving to the right is terminated. Repeating the same procedure to the left, one native line candidate remains $$nl_1=\{cc_1,cc_2,cc_3,cc_4,cc_5,cc_6\};$$

Figure 20:
FIG. 20 shows connected components being marked as part of a central line using a central line tracing procedure.

This native line is then passed to the text classifier (described in the "Text Classification" section below) where it will declare this line as textual (by virtue of its having textual features). All connected components are marked as being part of the central line and results in the situation that is depicted in FIG. 20 (in which reference number 2000 bounds the native line).

Next, the procedure is repeated again, omitting the connected components that are inside the found native line. As there are now three connected components left with equal score, $cc_7$ may be chosen arbitrarily. A native line is built out of this connected component. Central line tracing is not performed because no other connected components exist in the set of horizontal neighbors. This native line candidate is passed to the text classifier which will declare it to be non-textual since it does not have any textual features. The native line candidate is discarded and $cc_7$ is marked as visited. A similar process occurs with the connected components $cc_8$ and $cc_9$. This repeated procedure is illustrated in FIG. 21 where each red x (collectively identified by reference number 2100) means that a connected component is marked as visited.

Figure 21:
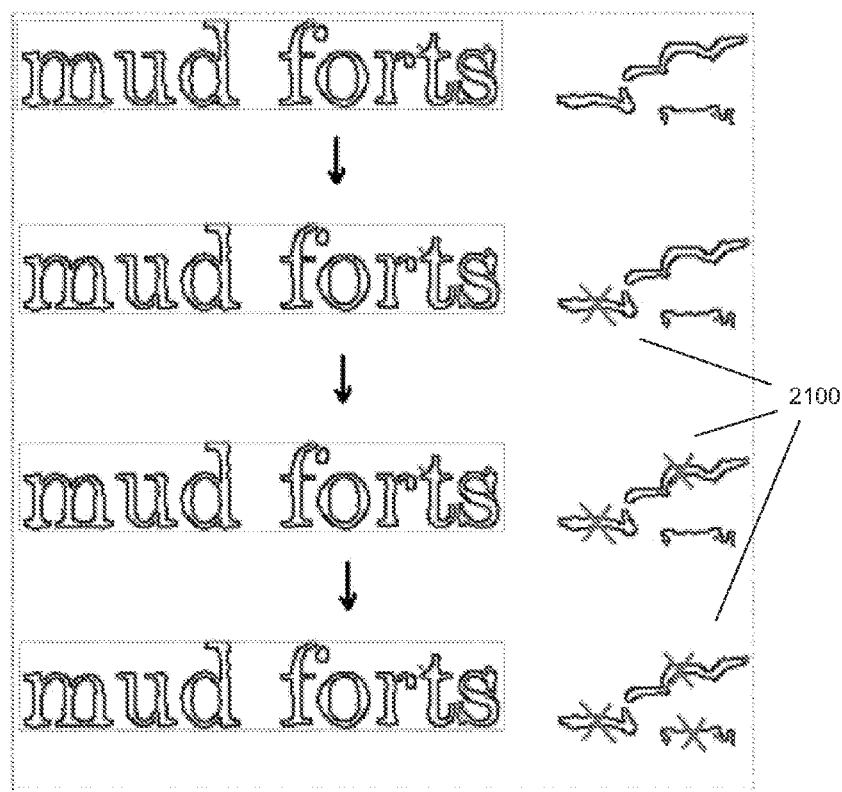
FIG. 21 shows illustrative steps in native lines detection.

At the last step depicted in FIG. 21, all the connected components are either inside the native line or marked as visited. Therefore, the further detection of native lines is ended. As a result of the central line tracing procedure, one native line is detected and three connected components are declared as non-textual. This result highlights the fact that text detection in the exemplary document 1500 in FIG. 15 is completely accurate.

The text classification mentioned above will now be described in greater detail.

Text Classification—The Central line tracing procedure described above relies significantly on text classification. Once a native line candidate is built using this procedure, then text classification is performed. As previously noted, the object for classification is a native line (i.e., the set of connected components with similar vertical statistics):

$$nl=\{cc_1,cc_2,\ldots,cc_n\}$$

The goal is to classify the native line as a textual line or non-textual line. The classification task formulated this way can be viewed as a binary classification task. One of the more frequently used ways of performing binary classification tasks is to employ some machine trainable classifier. In this approach a helpful step is to identify the useful features of objects being classified. Once the features are identified, the set of labeled samples (i.e., objects with known class) can be assembled and training of classifier performed. If the features and the set are of good quality, the trained classifier can generally be expected to be successfully used to classify a "new" object (i.e., an object not previously "seen" by the classifier).

The process of selecting the useful features for the binary classification can be significant. Generally, binary classification assumes that both classes are presented with "affirmative" features. Unfortunately, the text classification task is defined in such a way that there are class and "non-class," text and non-text, respectively. The non-text is essentially everything that is not text. Therefore it is not defined in terms of what it is but rather, what it is not. Therefore, finding useful features for non-text can be difficult in some cases. However, text is equipped with a high level of regularity and therefore the chosen features typically need to emphasize this regularity. The absence of regularity (as encoded through features) will typically indicate that an object class is non-text.

Figure 22:
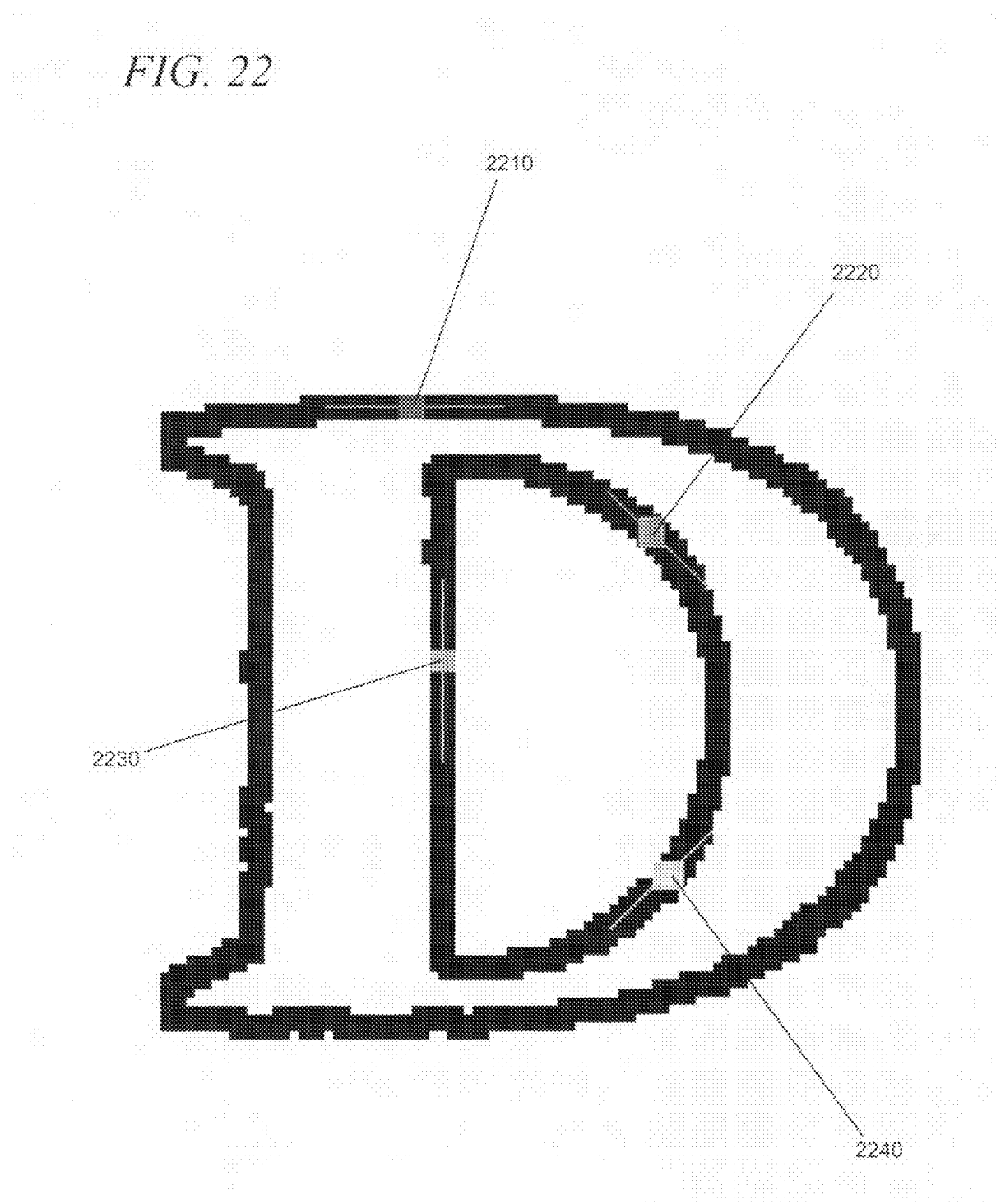
FIG. 22 shows how a text sample typically includes pixels with edge angles in various directions.

A native line is composed of connected components which are calculated in edge space. Therefore, location, intensity, and angle for each pixel are known. The meaningful set of features can be extracted using such known information. First, an attempt to extract the features from edge angle information is performed. Text typically includes pixels having edge angles in all directions (0, 45, 90, and 135 degrees) as illustrated in FIG. 22 as respectively indicated by reference numbers 2210, 2220, 2230, and 2240.

Figure 23:
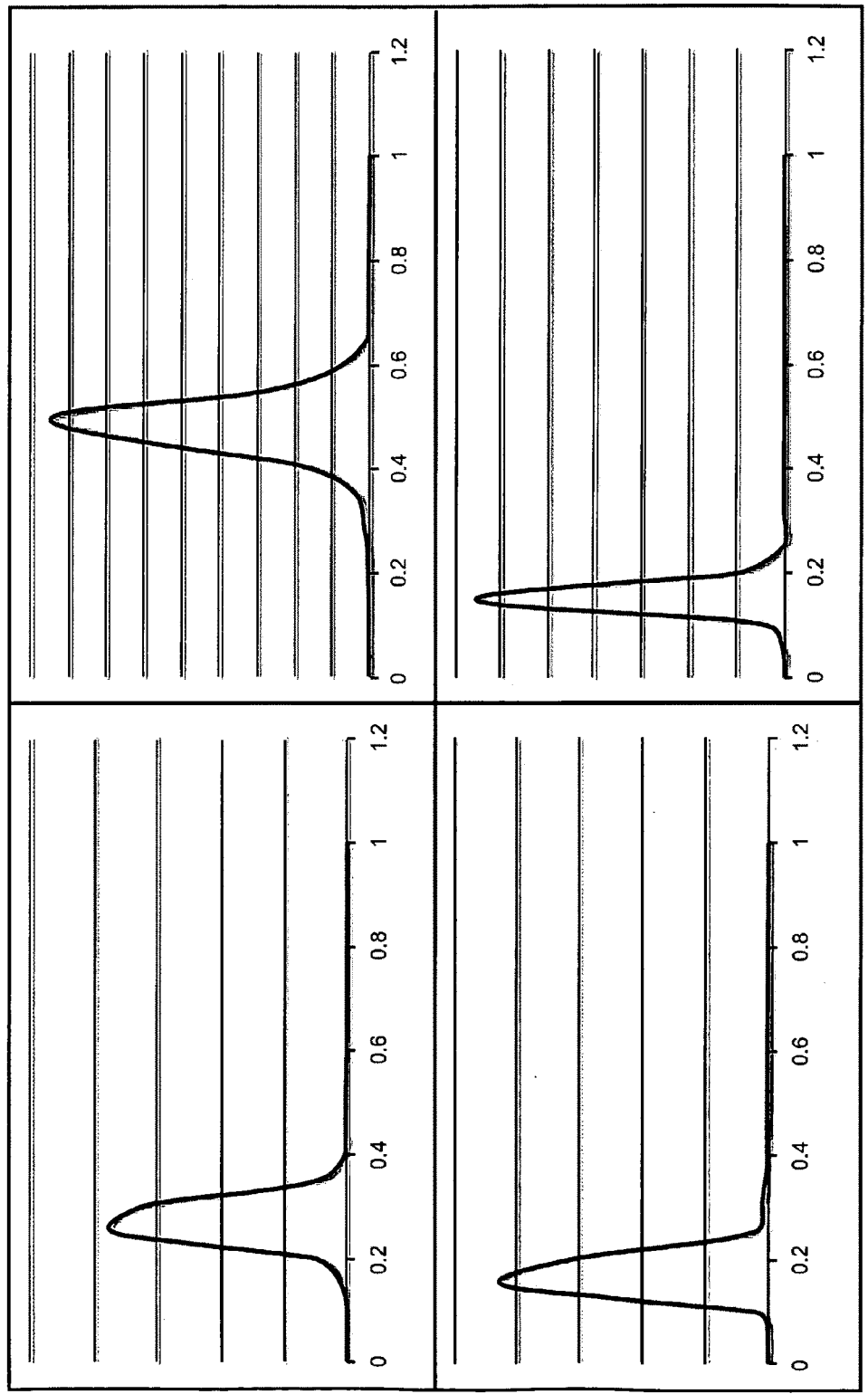
FIG. 23 shows an illustrative set of statistically derived probability distributions of edge angles (0, 90, 45, and 135 degrees) for the text sample shown in FIG. 22.

The subject to investigate is the probability distribution of edge angles. The statistically derived probability distributions are depicted in FIG. 23. This set of distributions, as indicated by reference number 2300 in FIG. 23, reveals notable regularity in edge distribution. The edge percents are sharply peaked around 0.3, 0.45, 0.15 and 0.15 for 0, 90, 45 and 135 degrees, respectively. If the calculated percentage of horizontal edges (i.e., 0 degree edges) is 60%, one may confidently conclude that a given native line is not a textual line because 99.99% of textual lines have a percentage of horizontal edges in the range of 15% to 45%. Thus, edge percentages are powerful features that may be advantageously used in text classification.

Figure 24:
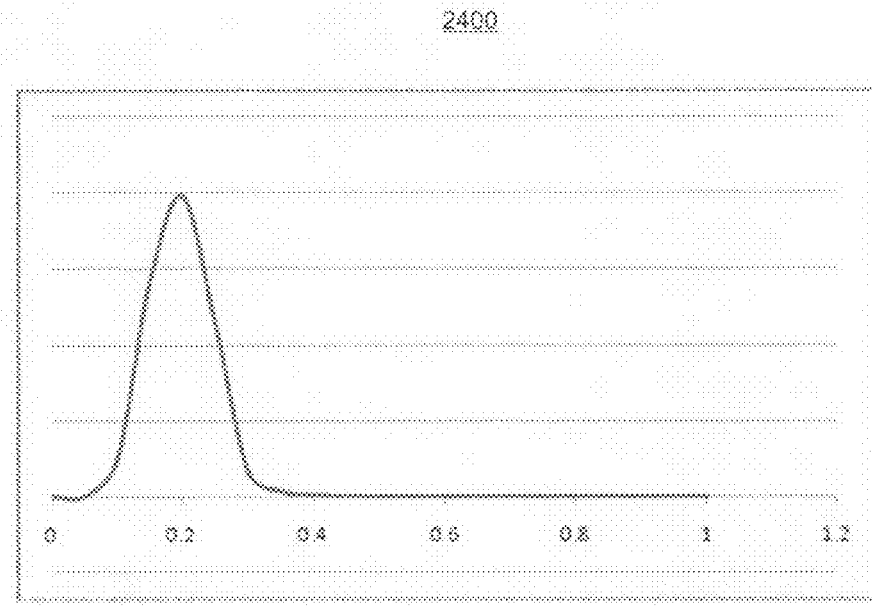
FIG. 24 shows an illustrative edge density probability.

Another subject to investigate is the "amount" of edges in a textual line. One appropriate way to quantify this value is by means of edge area density which is calculated by dividing the number of edge pixels (i.e., pixels making up connected components in edge space) with line area (i.e., width*height). Again, the significance of this value is evident when observing the probability distribution 2400 depicted in FIG. 24. The probability distribution is sharply peaked around 20% indicating that this may be a particularly valuable feature in the classification process in some instances.

In the discussion above, it was noted that all letters typically have common area between the mean line and the baseline. It can therefore often be expected that text line vertical projections will have maximal value in this area. Since edges capture the essence of the text, it may also be expected that the vertical projection of edges will maintain this same property. An example 2500 of the vertical projection of edges (where the edges are in all directions) is shown in FIG. 25.

Figure 25:
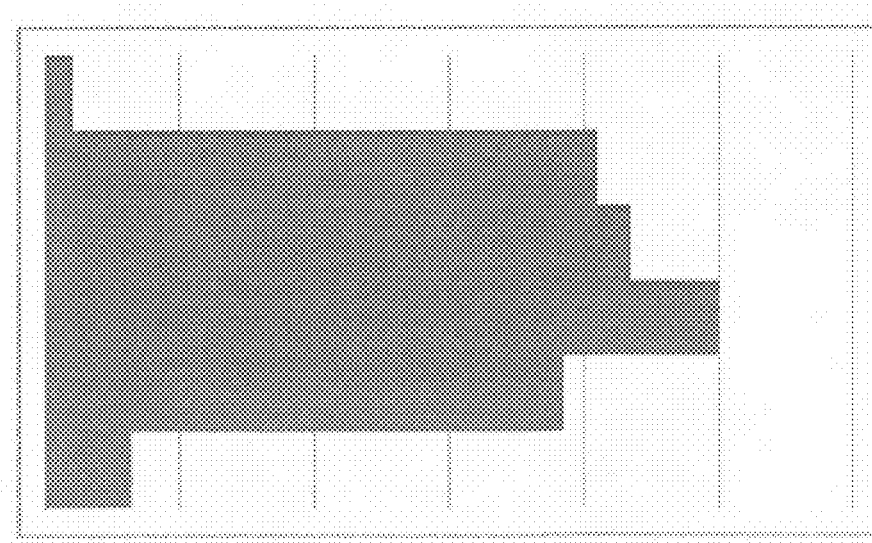
FIG. 25 shows an illustrative example of vertical projections of edges (where the edges are in all directions)
Figure 26:
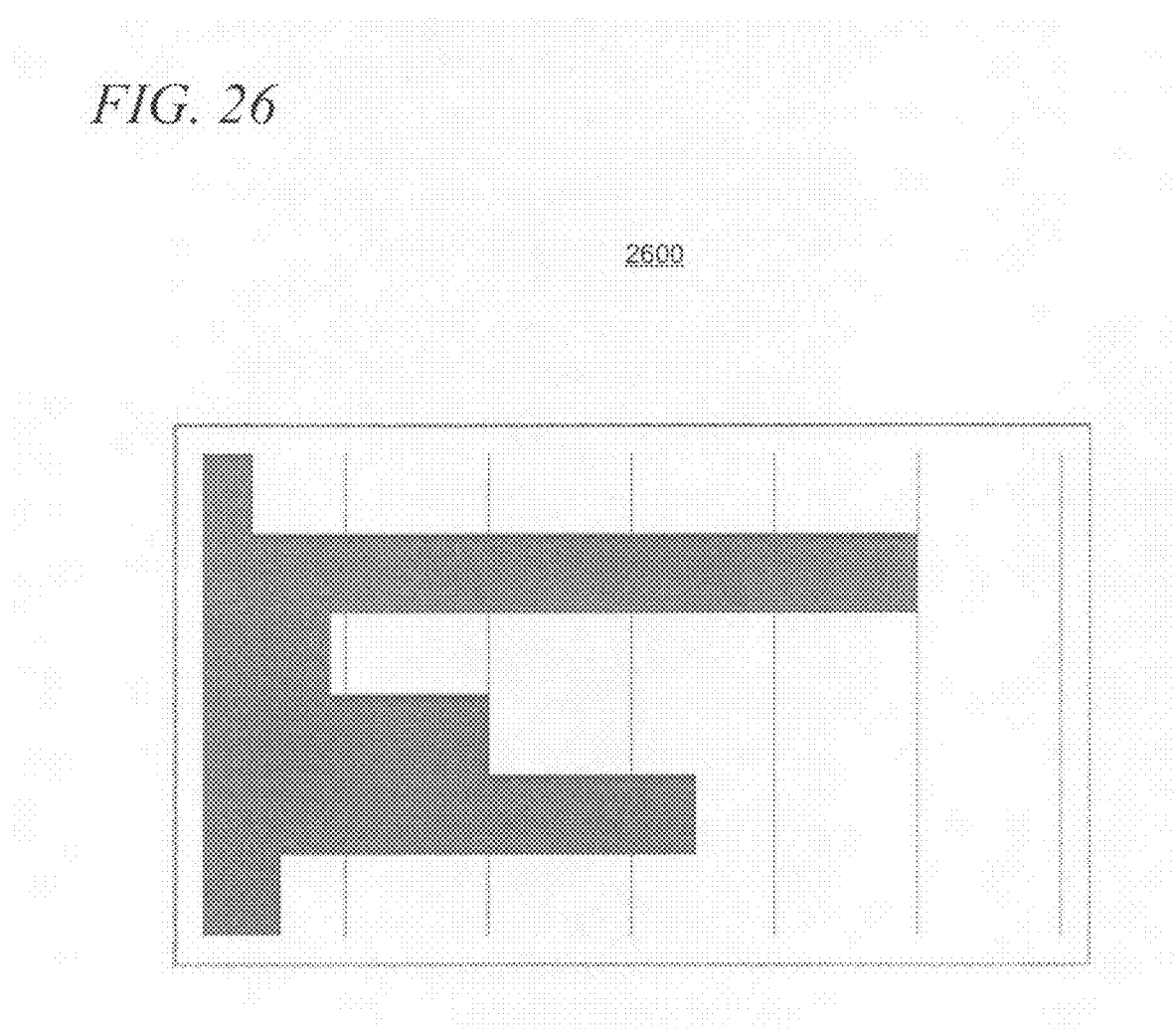
FIG. 26 shows an illustrative example of vertical projections of horizontal edges.

FIG. 25 shows that the area between mean line and baseline has a dominant number of edges, while a relatively small number of edges are outside this range. Another projection that pronounces mean line and baseline even more is the vertical projection of horizontal edges 2600 as illustrated in FIG. 26. It is noted that FIGS. 25 and 26 maintain similar form for all textual lines which can make vertical and horizontal edge projections conveniently used in text classification in some applications.

So far in this text classification discussion, some useful features for classification have been described. In the remainder of the discussion, the classification process is formalized. Let $\Omega$ be the set of all possible objects to be classified as text or non-text. Since there are two possible classes, the set $\Omega$ can be broken down into two distinct sets $\Omega_T$ and $\Omega_{NT}$ where $$\Omega_T \cap \Omega_{NT}=\{\ \}$$

$$\Omega_T \cap \cup_{NT}=\Omega$$

The set $\Omega_T$ includes all textual native lines while $\Omega_{NT}$ includes all non-textual lines. Given the native line nl={$cc_1$, $cc_2$, ..., $cc_n$} a classification goal is to determine whether nl∈$\Omega_T$ or nl∈$\Omega_{NT}$ holds.

The function feat: $\Omega \rightarrow R^n$ is called the featurization function. $R^n$ is called the feature space while n is the feature space dimension (i.e., number of features). The result of application of the featurization function on the native line nl is the point in feature space F=($f_1$, $f_2$, ..., $f_n$) called the feature vector:

$$F=\text{feat}(nl)$$

The function class:$R^n \rightarrow [0,1]$ is called the classification function. One possible form of the classification function is $$class(F) = \begin{cases} 1, & nl \in \Omega_T \\ 0, & nl \in \Omega_{NT} \end{cases}$$

In other words, if the native line is textual then the classification function returns 1 and if the native line is non-textual, the classification function returns 0.

While the featurization function may generally be carefully designed, the classification function may also be obtained through training the classifier. Known classifiers that may be used include, for example, artificial neural networks, decision trees, and AdaBoost classifiers, among other known classifiers.

Figure 27:
FIG. 27 depicts an illustrative document that shows the variety of images that may typically be encountered.

Image Region Detection—The discussion above noted how textual objects which are frequently encountered in printed documents are detected. The second type of document object that is also very frequent is an image object. Image objects can often be difficult to detect because they generally have no embedded regularity like text. Images can appear in an infinite number of shapes, having arbitrary gray-scale intensities distribution that can include sudden color changes as well as large flat areas. All of these factors can generally make images very difficult to detect. An exemplary document 2700 illustrating the variety of images that may typically be encountered on a document page is depicted in FIG. 27.

The first image 2710 in the document 2700 illustrates image gray-scale photography with an oval shape and a mix of large flat areas with fluctuating areas. The illusion of shades of gray is performed using a half-toning technique that uses different distributions of varying size dots. For example, using a "denser" dot distribution will result in a darker shade of gray. The second image 2720 illustrates a so called "line-art" image. These images are almost binary images (i.e., having only two grayscale values) that include distinct straight and curved lines placed against a background. Usually the shape of these types of images is arbitrary. The third image 2730 includes more complex shapes and represents a mixture of line-art and half-toning techniques. The fourth image 2740 in the document illustrates color photography which is characterized by large flat areas of different color.

Previously described examples in the discussion above support the assertion that detecting images (in terms of what they are) is often a difficult task, and may not be possible in some cases. However, there are a few observations that may lead to a solution to this image detection problem.

One observation is that images on documents are generally placed against background. This means that some kind of boundary between image and background will often exist. Quite opposite to images, a background may be equipped with a high degree of regularity, namely that there will not usually be sudden changes in intensity, especially in small local areas. This is so often the case, indeed, with one exception: the text. The text is also placed on the background just like the image which produces a large amount of edges.

One conclusion of such observation is that image detection could be performed indirectly through background detection if there is no text on the image. This statement is partly correct. Namely, if text is absent then it could be difficult to say whether one flat region is the background or a flat part of the image (e.g., consider the sky on the last image 2740 in FIG. 27). Thus, the final conclusion that may be drawn is that text defines the background, and once the background is detected, everything remaining is the image object.

Since now there is a high level strategy for coping with image detection, possible implementations may be investigated in greater detail. It is observed that image objects are generally large objects. This does not mean that an image is defined with absolute size, but rather in comparison with the text. In many cases the text size is an order of magnitude smaller that image size. Since algorithm implementation is typically concerned with efficiency, this observation has at least one positive consequence, namely that image details are not of interest but rather the image as a whole is of interest.

This consequence implies that some form of image resolution decrease may be performed without any loss of information which has a positive impact on subsequent processing in terms of efficiency. Furthermore, resolution decrease has an inherent property of omitting small details. If, in this resolution decrease process text may be eliminated (because its location on the document image is known due to the previously presented text detection procedure, and given the observation that text is a small detail on the document image), then a reasonable starting point for image detection is established.

Thus, a first step in image object detection is to find a representative text height. An effective way to do this is to calculate the median height in the set of previously detected native lines. This value may be marked with $TH_{med}$. If the input image has width wand height h, then operator DRFT: $\Omega_o \rightarrow \Omega_{LR}$ may be defined where $\Omega_o$ is the set of all images with dimensions w×h and $\Omega_{LR}$ is the set of all images with dimensions $$w/TH_{med} \times h/TH_{med} \text{ with kernel:}$$

$$I_{LR}(x, y) = \frac{\sum_{i=x}^{x+TH_{med}} \sum_{j=y}^{y+TH_{med}} I(i,j) * IL(i,j)}{\sum_{i=x}^{x+TH_{med}} \sum_{j=y}^{y+TH_{med}} IL(i,j)}$$

$$IL(i,j) = \begin{cases} 1, & \text{if } (i,j) \text{ is in the connected component which is part of some native line} \\ 0, & \text{otherwise} \end{cases}$$

The acronym DRFT stands for "decrease resolution and filter text". In other words, conditional averaging over pixels which are not part of previously detected native lines may be performed. This conditional averaging may lead to some output pixels having an undefined value since all input pixels are part of a native line. These "holes" in the output image may be filled, for example, using conventional linear interpolation.

The fact is that text filtering as performed will not completely remove the text from the document image due to some text parts not being detected in the text detection described above. To remove these artifacts, median filter which is a well known technique for noise removal in image processing may be applied to eliminate a significant portion of the remaining text influence.

Figure 28:
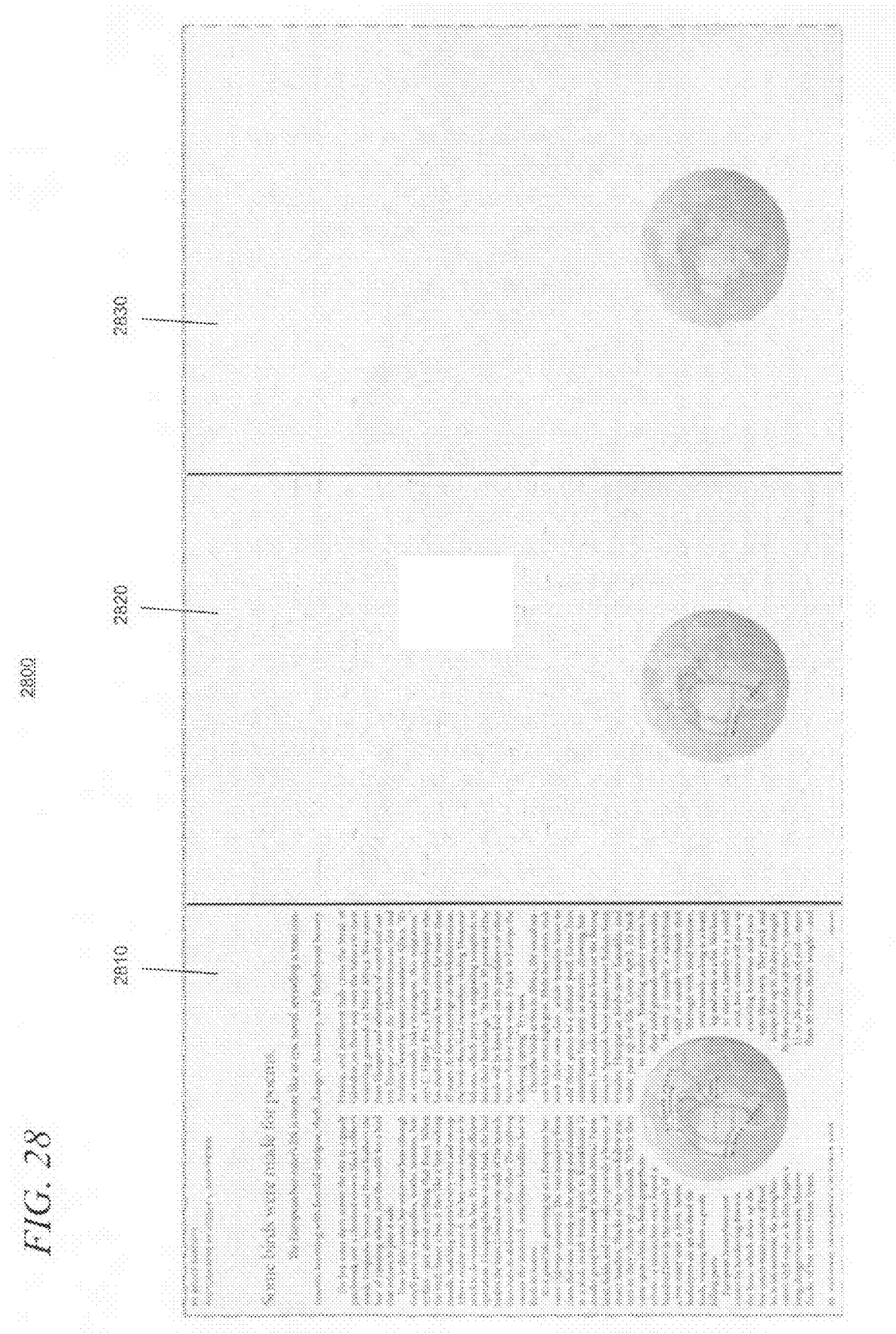
FIG. 28 shows illustrative results of resolution decrease and text filtering in an exemplary document.

The resolution decrease and text filtering process is depicted using the exemplary document 2800 in FIG. 28. The input image 2810 has size of 1744×2738 pixels while output image has a size of 193×304 pixels. This means that all subsequent processing, which mainly has complexity o(width×height), will be 81 times faster. In addition, a fair amount of dots in the middle image 2820 can be observed due to non-detected text and noise. After applying the median filter, what remains is the third image 2830 which is almost free of these non-desirable artifacts. The third image 2830 thus suggests all the advantages of the approach. The background is very flat and clean while images appear as large blurred objects which disturb the uniformity of the background.

Figure 29:
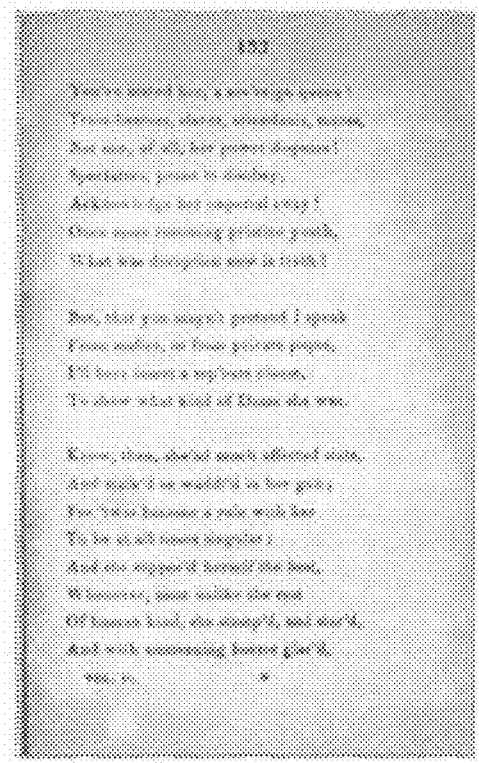
FIG. 29 shows an illustrative color document having a slowly varying background.

Once the text influence has been eliminated and the groundwork prepared for efficient processing, a way to detect the background is desired. One observation needed for the following discussion related to background detection is that background is defined as the slowly varying area on the image. Generally, defining the background as an area of constant intensity is to be avoided (in spite of the fact that backgrounds having a constant intensity are common) since there are backgrounds which slowly change their intensity as shown, for example, by the sample 2900 depicted in FIG. 29. Rather, it may only be assumed, that intensity is almost constant in a small local part of the background.

Figure 30:
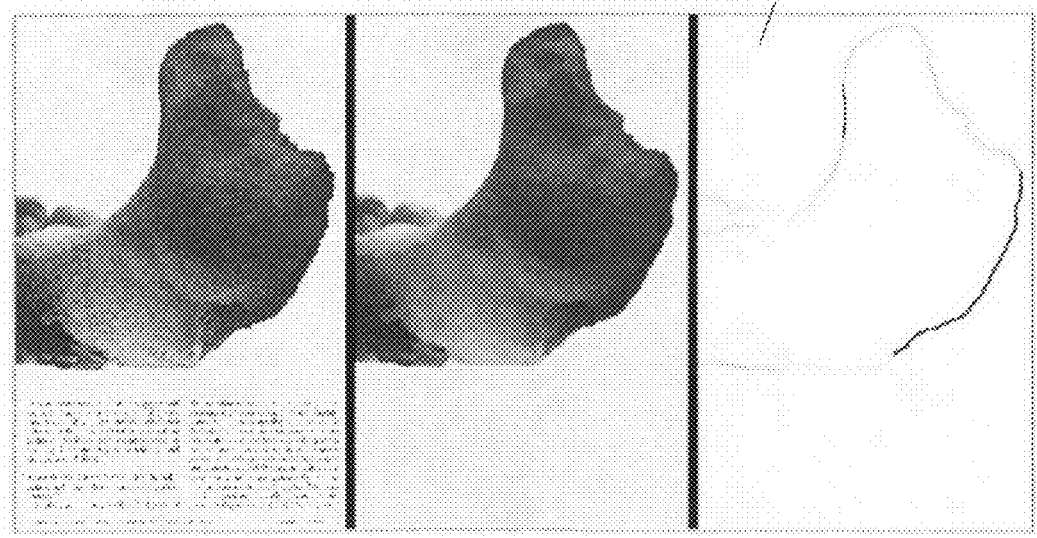
FIG. 30 shows the application of a VAR operator to an exemplary document.

To be able to assess the local uniformity of the background, it is desired to define uniformity measure. The simple local intensity variance concept is more than satisfactory for these circumstances. Therefore, operator VAR:Ω→Ω is introduced and defined with a kernel:

$$I_{var}(x, y) = \frac{\sum_{i=-w}^{w} \sum_{j=-w}^{w} |I(x, y) - I(x-i, y-j)|}{(2*w+1)*(2*w+1)}$$

where w is the filter size. It can typically be expected that w=1 will yield good results. The illustration of applying the VAR operator to a document 3000 is depicted in FIG. 30. The VAR operator is very similar to edge detection operators but it is slightly biased towards finding the flat areas as opposed to finding discontinuities.

A major portion of the third image 3030 (i.e., the variance image) in FIG. 30 is almost white which means high intensity uniformity at these pixels. Now, the question is how much a given pixel has to be flat in order to be considered as a potential background pixel. To be able to answer this question, it is desired to find pixels which are almost surely background pixels without using pixel variation. The solution lies in pixels which are part of detected text.

Figure 31:
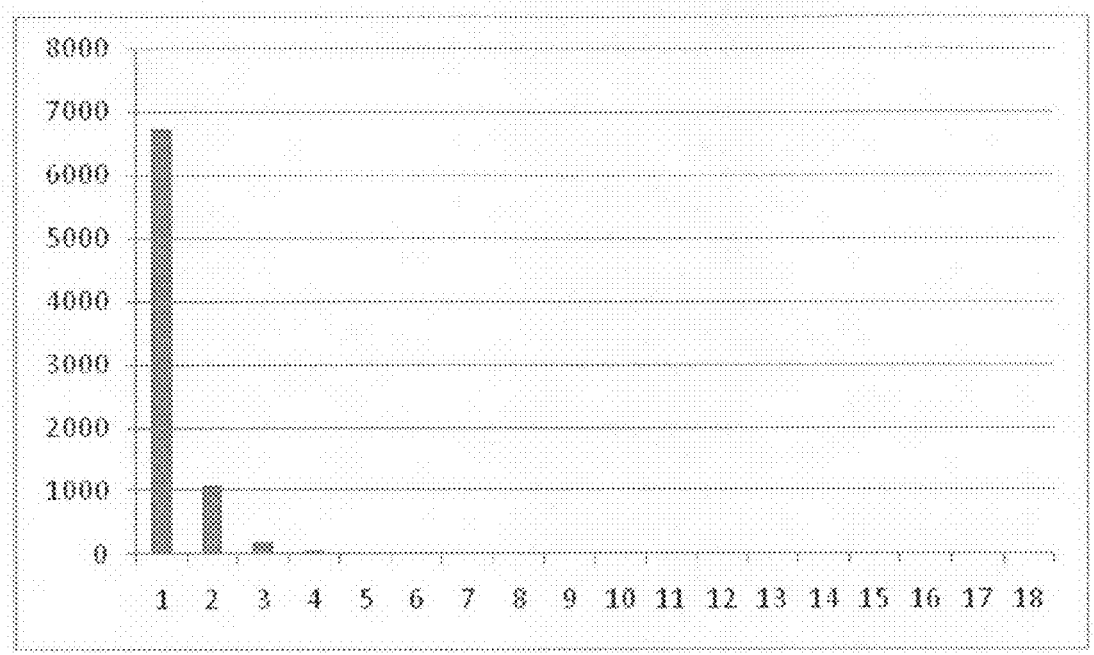
FIG. 31 shows a histogram of variance values for text pixels in the document shown in FIG. 30.

As previously stated, the background cannot generally be detected without text because text background is what defines the document image background. Fortunately, through application of text detection, it is known where the text is located on a document. Therefore, the histogram of variance values at text pixels can be created. A histogram 3100 is depicted in FIG. 31 for the document 3000 shown in FIG. 30. Typically, the bin values fall to zero very fast so only the non-zero portion of the histogram is given for the sake of clarity. Bin values decrease rapidly and most of the text pixels have zero local variance. From the histogram 3100, the threshold value defining the maximal local background variance may be extracted. The first value where a histogram bin has less than 10% of maximal histogram bin may be taken. In the case of FIG. 31, this means 3. This value will be noted as $BV_{max}$.

Now that the maximal background variance has been found, pixel based classification may be performed on potential background pixels and non-background pixels, namely:

$$I_{class}(x, y) = \begin{cases} I_b, & I_{var}(x, y) < BV_{max} \\ I_{nb}, & \text{otherwise} \end{cases}$$

Figure 32:
FIG. 32 shows illustrative results of pixel-based classification on background and non-background pixels for the document shown in FIG. 30.

The classification image y) for $I_{class}(x, y)$ for $I_b$=200 and $I_{nb}$=255 is depicted in FIG. 32 and indicated by reference number 3200. The classification image 3200 reveals all the capabilities and strengths of the present text-based variance-threshold picking approach. Namely, almost all the background pixels are classified as potential background pixels, while the image 3200 contains a mixture of classes. Also note that there is a small amount of discontinuities that median filtering was unable to remove. However, such discontinuities do not ruin the general properties of classification.

The potential background pixels (i.e., pixels with small variance) are called homogenous pixels. The potential image object pixels (i.e., pixels with large variance) are called wavy pixels. Now, an additional feature of background is observed in order to be able to proceed with background detection. Namely, background is generally a relatively large area made up of homogenous pixels which are connected. This observation leads to the next step which is the detection of connected components on the classification image 3200. Connected component detection yields two sets of connected components:

$$HCC=\{hcc_1, hcc_2, \ldots, hcc_n\}$$

$$WCC=\{wcc_1, wcc_2, \ldots, wcc_m\}$$

where HCC stands for homogenous connected components (i.e., connected components made up of homogenous pixels) and WCC stands for wavy connected components (i.e., connected components made up of wavy pixels).

At this point, all the needed data to find background and image object regions is available. The background is picked from the HCC set while the image objects are picked from the WCC set. The criterion used for declaring the $hcc_i$ as the background may be rather simple, namely that it may be demanded that $hcc_i$ has pixels that are text pixels. Quite similarly, the $wcc_i$ may be declared as an image object if its size is greater than α. It may be expected that α=3 yields good results in many cases. Background and images picking yields an additional two sets $$IM=\{Im_1, \ldots, Im_k\}; Im_i \in HCC, 1 \leq i \leq k$$

$$BCK=\{Bck_1, \ldots, Bck_l\}; Bck_i \in WCC, 1 \leq i \leq l$$

Figure 33:
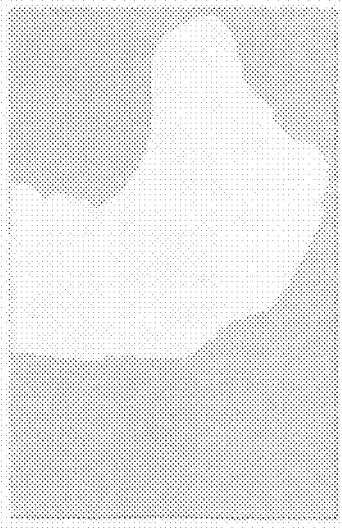
FIG. 33 shows the results of final image detection for the document shown in FIG. 30 with all pixels assigned to either background or image connected component.

Once the background and image seeds have been picked, what to do with the remaining homogenous and wavy connected components, namely components from sets HCC\BCK and WCC\BCK may be decided. These connected components are either the local fluctuations in the background or flat areas on the image. These connected components will end up either as a part of image or background. An effective way to achieve this is to perform successive merging of connected components with their surrounding connected components. Due to the nature of the connected component labeling process, each connected component is completely surrounded with other connected components, and in particular, homogenous with wavy or wavy with homogenous. The merging procedure ends up with empty HCC and WCC sets and with all pixels assigned either to background or to the image connected component. This is illustrated in the image 3300 shown in FIG. 33 which illustrates the final result of the present image detection technique.

Figure 34:
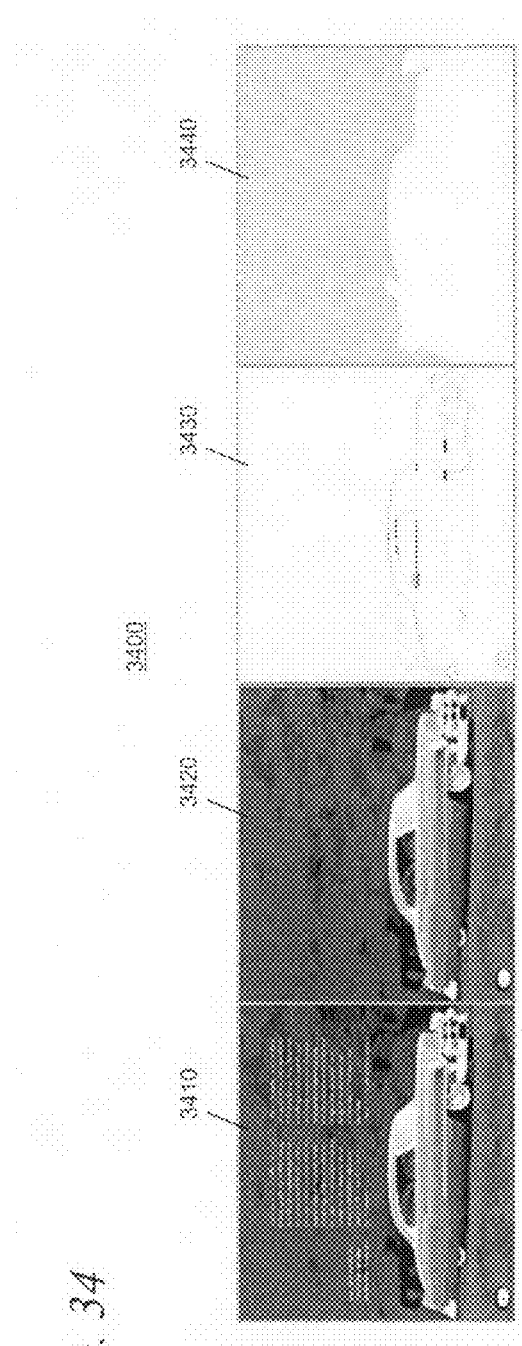
FIGS. 34 and 35 are illustrative examples which highlight the present image detection technique.
Figure 35:
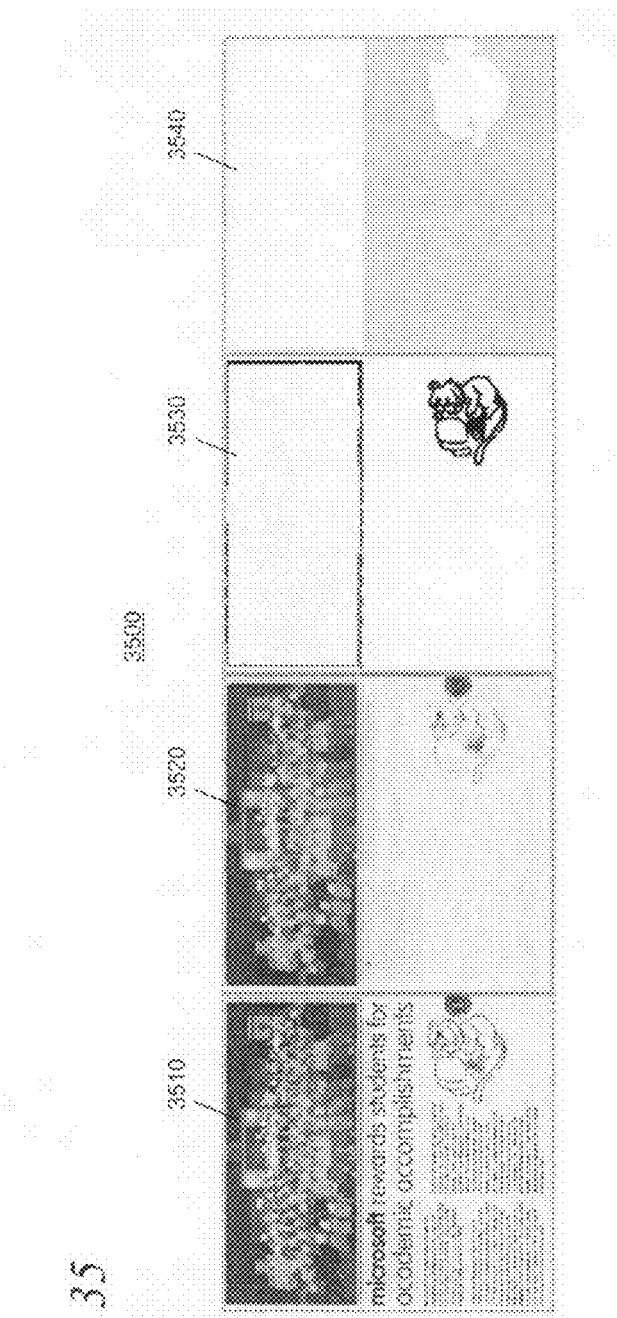

At this point, image object detection is completed. Several illustrative examples highlighting the present image detection techniques are respectively shown in FIGS. 34 and 35. The first images 3410 and 3510 are the original images; the second images 3420 and 3520 are in low resolution with filtered text; the third images 3430 and 3530 are the variance images; and the fourth images 3440 and 3540 are the final classification images.

Figure 36:
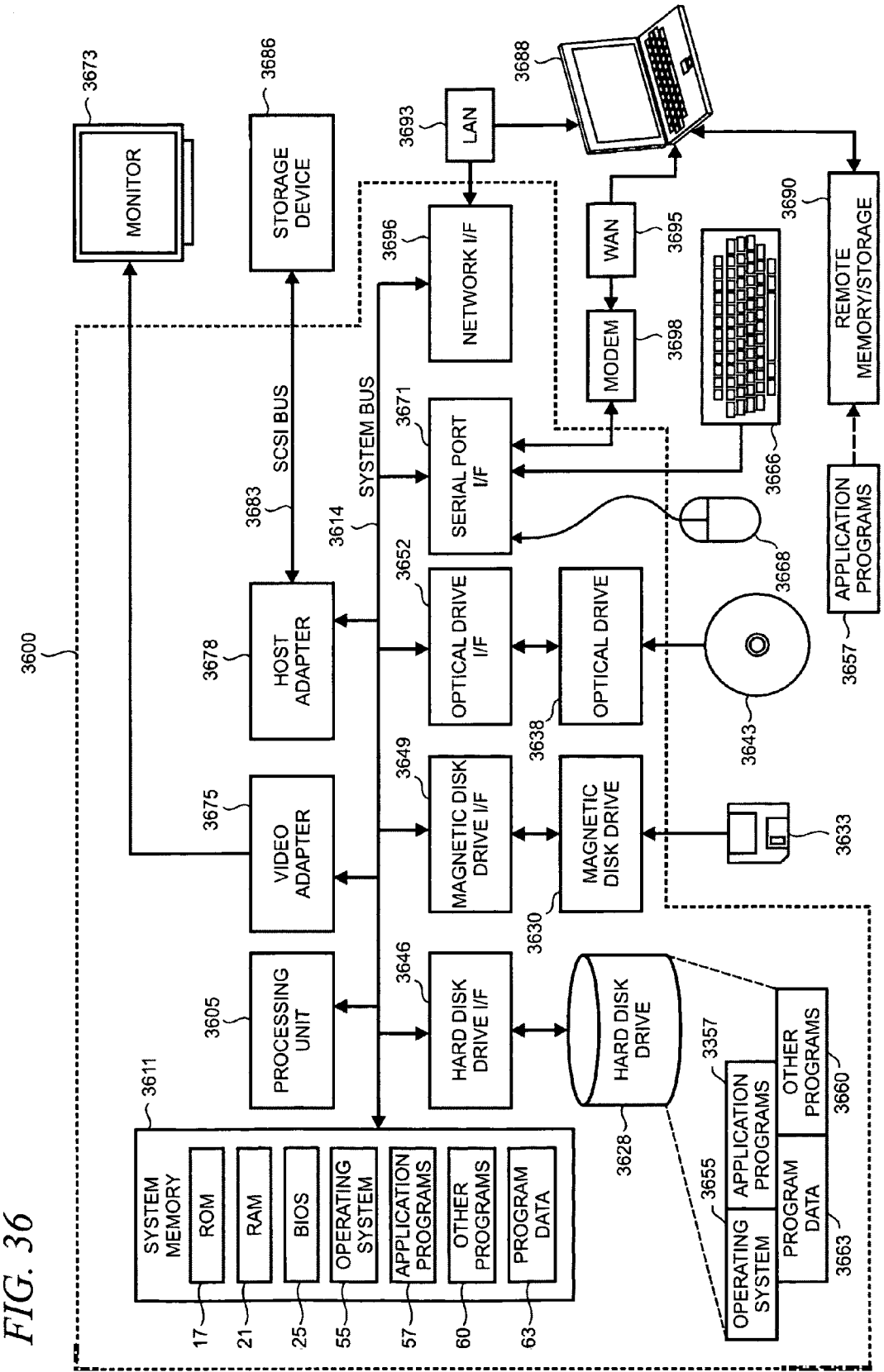
FIG. 36 is a simplified block diagram of an illustrative computer system 3600 such as a personal computer (PC) or server with which the present line segmentation may be implemented Like reference numbers indicate like elements in the drawings.

FIG. 36 is a simplified block diagram of an illustrative computer system 3600 such as a personal computer (PC) or server with which the present page segmentation may be implemented. Computer system 3600 includes a processing unit 3605, a system memory 3611, and a system bus 3614 that couples various system components including the system memory 3611 to the processing unit 3605. The system bus 3614 may be any of several types of bus structures including a memory bus or memory controller, a peripheral bus, and a local bus using any of a variety of bus architectures. The system memory 3611 includes read only memory (ROM) 3617 and random access memory (RAM) 3621. A basic input/output system (BIOS) 3625, containing the basic routines that help to transfer information between elements within the computer system 3600, such as during start up, is stored in ROM 3617. The computer system 3600 may further include a hard disk drive 3628 for reading from and writing to an internally disposed hard disk (not shown), a magnetic disk drive 3630 for reading from or writing to a removable magnetic disk 3633 (e.g., a floppy disk), and an optical disk drive 3638 for reading from or writing to a removable optical disk 3643 such as a CD (compact disc), DVD (digital versatile disc) or other optical media. The hard disk drive 3628, magnetic disk drive 3630, and optical disk drive 3638 are connected to the system bus 3614 by a hard disk drive interface 3646, a magnetic disk drive interface 3649, and an optical drive interface 3652, respectively. The drives and their associated computer readable media provide non-volatile storage of computer readable instructions, data structures, program modules and other data for the computer system 3600. Although this illustrative example shows a hard disk, a removable magnetic disk 3633 and a removable optical disk 3643, other types of computer readable media which can store data that is accessible by a computer such as magnetic cassettes, flash memory cards, digital video disks, data cartridges, random access memories (RAMs), read only memories (ROMs), and the like may also be used in some applications of the present page segmentation. In addition, as used herein, the term computer readable medium includes one or more instances of a media type (e.g., one or more magnetic disks, one or more CDs, etc.).

A number of program modules may be stored on the hard disk, magnetic disk 3633, optical disc 3643, ROM 3617, or RAM 3621, including an operating system 3655, one or more application programs 3657, other program modules 3660 and program data 3663. A user may enter commands and information into the computer system 3600 through input devices such as a keyboard 3666 and pointing device 3668 such as a mouse. Other input devices (not shown) may include a microphone, joystick, game pad, satellite disk, scanner, or the like. These and other input devices are often connected to the processing unit 3605 through a serial port interface 3671 that is coupled to the system bus 3614, but may be connected by other interfaces, such as a parallel port, game port or universal serial bus ("USB"). A monitor 3673 or other type of display device is also connected to the system bus 3614 via an interface, such as a video adapter 3675. In addition to the monitor 3673, personal computers typically include other peripheral output devices (not shown), such as speakers and printers. The illustrative example shown in FIG. 36 also includes a host adapter 3678, a Small Computer System Interface (SCSI) bus 3683, and an external storage device 3686 connected to the SCSI bus 3683.

The computer system 3600 is operable in a networked environment using logical connections to one or more remote computers, such as a remote computer 3688. The remote computer 3688 may be selected as another personal computer, a server, a router, a network PC, a peer device, or other common network node, and typically includes many or all of the elements described above relative to the computer system 3600, although only a single representative remote memory/storage device 3690 is shown in FIG. 36. The logical connections depicted in FIG. 36 include a local area network ("LAN") 3693 and a wide area network ("WAN") 3695. Such networking environments are often deployed, for example, in offices, enterprise-wide computer networks, intranets, and the Internet.

When used in a LAN networking environment, the computer 3600 is connected to the local area network 3693 through a network interface or adapter 3696. When used in a WAN networking environment, the computer system 3600 typically includes a broadband modem 3698, network gateway, or other means for establishing communications over the wide area network 3695, such as the Internet. The broadband modem 3698, which may be internal or external, is connected to the system bus 3614 via a serial port interface 3671. In a networked environment, program modules related to the computer system 3600, or portions thereof, may be stored in the remote memory storage device 3690. It is noted that the network connections shown in FIG. 36 are illustrative and other means of establishing a communications link between the computers may be used depending on the specific requirements of an application of page segmentation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for use in an optical character recognition process, the method for detecting textual lines in an input comprising a de-skewed gray scale image of a document, the method comprising the steps of:
   applying an edge detection operator to detect edges in the image to generate an edge space;
   identifying one or more connected components from the edge space;
   building one or more native line candidates from the connected components through application of central line tracing; and
   classifying the one or more native line candidates using binary classification as either textual or non-textual by examining the one or more native line candidates for embedded regularity in the edge space.

2. The method of claim 1 in which the central line tracing includes finding a set of horizontal neighbors for each of the one or more connected components, assigning a score to each of the one or more connected components, the score representing a probability that a connected component belongs to a textual line, and estimating a central line for each connected component through application of horizontal neighbor voting.

3. The method of claim 2 in which the central line tracing further includes selecting a connected component having a maximal score as a seed, building a native line candidate by moving right and comparing a difference between central lines of the seed and the right connected component against a threshold, and if the difference is less than the threshold, then adding the right connected component to the native line candidate.

4. The method of claim 3 in which the central line tracing includes iterating the moving to the right until either the difference exceeds the threshold or a last connected component on the right is encountered.

5. The method of claim 4 in which the central line tracing further includes moving left and comparing a difference between central lines of the seed and the left connected component against a threshold, and if the difference is less than the threshold, then adding the left connected component to the native line candidate.

6. The method of claim 5 in which the central line tracing includes iterating the moving to the left until either the difference exceeds the threshold or a last connected component on the left is encountered.

7. The method of claim 1 in which the classifying includes comparing edge angles of pixels in the edge space against a probability distribution of edge angles that is associated with text.

8. The method of claim 1 in which the classifying includes determining edge area density in pixels in the edge space.

9. The method of claim 1 in which the classifying includes determining vertical projection of edges in the edge space.

10. A method for use in an optical character recognition process, the method for detecting image regions in an input comprising a de-skewed gray scale image of a document, the method comprising the steps of:
defining a background of the image region by detecting text in the image;
decreasing image resolution to filter text from the image;
creating a variance image from the filtered image;
determining a threshold value defining a maximal local variance from pixels in the detected text; and
generating a classification image by performing pixel based classification based on the maximal background variance to identify background pixels and image region pixels.

11. The method of claim 10 including a further step of applying a median filter to remove noise from the filtered image.

12. The method of claim 10 including a further step of detecting connected components in the classification image to generate a set of connected components comprising homogenous pixels and a set of connected components comprising wavy pixels.

13. The method of claim 12 including the further steps of selecting a background seed from the set of connected components comprising homogenous pixels and selecting an image seed from the set of connected components comprising wavy pixels.

14. The method of claim 13 including a further step of, beginning with respective background and image seeds, successively merging connected components from the set of connected components comprising homogenous pixels and the set of connected components comprising wavy pixels into surrounding connected components until the sets are empty and all pixels are assigned to either background connected components or image connected components.

15. The method of claim 14 in which a connected component with homogenous pixels is merged into a connected component with wavy pixels.

16. The method of claim 14 in which a connected component with wavy pixels is merged into a connected component with homogenous pixels.

17. A method for page segmentation in an optical character recognition process to detect one or more textual objects or image objects in an input de-skewed gray scale image, the method comprising the steps of:
creating an edge space from the gray scale image;
applying central line tracing to connected components identified in the edge space to generate one or more native line candidates from the connected components;
classifying the native line candidates as textual lines or non-textual lines so as to detect textual objects in the image;
determining, from pixels in the detected text, a threshold value defining a maximal local variance; and
generating a classification image by performing pixel based classification based on the maximal background variance to identify background pixels and image region pixels so as to detect image objects in the image.

18. The method of claim 17 in which the classifying includes examining the one or more native line candidates for embedded regularity in the edge space.

19. The method of claim 17 including a further step of decreasing image resolution to filter text from the image.

20. The method of claim 19 including a further step of generating a variance image from the filtered image.

* * * * *